United States Patent
Goto et al.

(10) Patent No.: US 8,678,635 B2
(45) Date of Patent: Mar. 25, 2014

(54) SURFACE LIGHT SOURCE DEVICE, LIQUID CRYSTAL DISPLAY DEVICE AND OPTICAL MEMBER

(75) Inventors: Masahiro Goto, Kashiwa (JP); Hiroshi Sekiguchi, Tokyo-to (JP); Hiroshi Yamamoto, Kawaguchi (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 225 days.

(21) Appl. No.: 13/228,923

(22) Filed: Sep. 9, 2011

(65) Prior Publication Data
US 2012/0113158 A1 May 10, 2012

(30) Foreign Application Priority Data
Sep. 14, 2010 (JP) ................. 2010-205949

(51) Int. Cl.
G09G 5/10 (2006.01)
G02F 1/1335 (2006.01)
F21V 8/00 (2006.01)
G02B 6/00 (2006.01)

(52) U.S. Cl.
USPC ............ 362/613; 362/612; 362/619; 362/620

(58) Field of Classification Search
USPC .................. 362/612, 613, 619, 620
See application file for complete search history.

(56) References Cited

U.S. PATENT DOCUMENTS

| 8,092,068 B2* | 1/2012 | Parker et al. .................. 362/620 |
| 2007/0002568 A1* | 1/2007 | Lee et al. ...................... 362/331 |
| 2009/0086506 A1* | 4/2009 | Okumura ...................... 362/613 |

FOREIGN PATENT DOCUMENTS

JP 2007-227405 A1 9/2007

* cited by examiner

*Primary Examiner* — Stephen F Husar
*Assistant Examiner* — James Cranson, Jr.
(74) *Attorney, Agent, or Firm* — Burr & Brown, PLLC

(57) ABSTRACT

A surface light source device has a light emitting surface and includes a light guide plate having a light exit surface and a pair of light entrance surfaces. When the angular distribution of luminance in a plane parallel to a first direction is measured on the light emitting surface at varying positions along the first direction, the peak angle θc in the angular distribution of luminance at a center position Pc in the first direction lies between the peak angle θa in the angular distribution of luminance at an end position on one side in the first direction and the peak angle θb in the angular distribution of luminance at an end position on the other side in the first direction.

17 Claims, 18 Drawing Sheets

SURFACE LIGHT SOURCE DEVICE, LIQUID CRYSTAL DISPLAY DEVICE AND OPTICAL MEMBER

CROSS-REFERENCE TO RELATED APPLICATIONS

This application claims priority to Japanese Patent Application No. 2010-205949, filed on Sep. 14, 2010, the disclosure of which is incorporated herein by reference in its entirety. Further, the disclosure of Japanese Patent Application No. 2011-137556, filed on Jun. 21, 2011 is incorporated herein by reference in its entirety.

BACKGROUND OF THE INVENTION

1. Field of the Invention

The present invention relates to a surface light source device having a light emitting surface, and a display device including the surface light source device, and more particularly to a surface light source device and a display device which can effectively equalize the in-plane distribution of perceived brightness.

2. Description of the Related Art

A surface light source device having a two-dimensional light emitting surface is in widespread use as a backlight which is incorporated, for example, in a liquid crystal display device and illuminates a liquid, crystal display panel from the back (see e.g. JP 2007-227405A). Surface light source devices for liquid crystal display devices are roughly classified into direct-light type devices which have a light source disposed right behind an optical member, and edge-light type devices (also called side-light type devices) which have a light source disposed lateral to an optical member.

In an edge-light type surface light source device, a light source is provided lateral to a light guide plate, and light from the light source enters the light guide plate from the side surface (light entrance surface) of the light guide plate. The light that has entered the light guide plate repeatedly reflects from a pair of the opposing main surfaces and travels in the light guide plate in a direction (light guide direction) almost perpendicular to the light entrance surface. The light traveling in the light guide plate, by the optical action of the light guide plate, is caused to gradually exit the pair of the main surfaces as it travels in the light guide plate. In an exemplary light guide plate, a diffusing component is dispersed in the light guide plate. By changing the travel direction of light by the diffusing component, the light is allowed to gradually exit the light guide plate at varying positions along the light guide direction.

Such a surface light source device has been required to secure a high front-direction luminance and enhance the uniformity of the in-plane distribution of the front-direction luminance. Thus, it has been considered ideal for a surface light source device if the angular distributions of luminance, measured at varying positions on the light emitting surface of the surface light source device, are approximately the same and each have the maximum luminance in the front direction. A display device is expected to display a bright image in the front direction by using such a surface light source device.

Nowadays, with the development of LED and the like which can achieve energy saving and linear lighting, an edge-light type surface light source device is becoming larger and has come to be used in combination with a large-sized display surface. A problem, however, exists in that when a surface light source device which has ever been considered ideal is used, considerable variation can be produced in the in-plane distribution of brightness perceived by a viewer.

SUMMARY OF THE INVENTION

The present invention has been made in view of the above situation. It is therefore an object of the present invention to provide a surface light source device and a display device which can make the in-plane distribution of perceived brightness more uniform.

The present invention provides a surface light source device having a light emitting surface, comprising a light guide plate having a light exit surface and a pair of side surfaces which oppose to each other in a first direction, at least one of the pair of side surfaces serving as a light entrance surface, wherein when the angular distribution of luminance in a plane parallel to both the front direction and the first direction is measured on the light emitting surface at varying positions along the first direction under the following definition: the front direction is 0°, an angle between the front direction and a direction inclined from the front direction toward one side in the first direction is a negative value, and an angle between the front direction and a direction inclined from the front direction toward the other side in the first direction is a positive value, a peak angle $\theta a$ that gives the maximum luminance in the angular distribution of luminance at a first end position, an end position on the one side in the first direction, on the light emitting surface, a peak angle $\theta b$ that gives the maximum luminance in the angular distribution of luminance at a second end position, an end position on the other side in the first direction, on the light emitting surface, and a peak angle $\theta c$ that gives the maximum luminance in the angular distribution of luminance at a center position in the first direction on the light emitting surface, satisfy the following relation:

$$\theta b < \theta c < \theta a,$$

In a preferred embodiment of the present invention, the surface light source device further comprises a first light source disposed so as to face a first light entrance surface, lying on the one side in the first direction, of the light guide plate, and a second light source disposed so as to face a second light entrance surface, lying on the other side in the first direction, of the light guide plate, wherein when the angular distribution of luminance in a plane parallel to both the front direction and the first direction is measured at the center position on the light emitting surface under the following definitions: the front direction is 0°, an angle between the front direction and a direction inclined from the front direction toward one side in the first direction is a negative value, and an angle between the front direction and a direction inclined from the front direction toward the other side in the first direction is a positive value, a peak angle $\theta c1$ that gives the maximum luminance in the angular distribution of luminance, attributable to a first light component emitted by the first light source, takes a positive value, In the surface light source device according to the present invention, the peak angle $\theta c1$ may be not less than 5° and not more than 15°.

In the surface light source device according to the present invention, when the angular distribution of luminance in a plane parallel to both the front direction and the first direction is measured at the center position on the light emitting surface under the following definitions: the front direction is 0°, an angle between the front direction and a direction inclined from the front direction toward one side in the first direction is a negative value, and an angle between the front direction and a direction inclined from the front direction toward the other side in the first direction is a positive value, the peak angle θc2 that gives the maximum luminance in the angular distribution of luminance, attributable to a second light component emitted by the second light source, may take a negative value.

In the surface light source device according to the present invention, the peak angle θc2 may be not less than −15° and not more than −5°.

In a preferred embodiment of the present invention, the surface light source device further comprises a light control sheet disposed on a light exit side of the light guide plate, wherein the light control sheet has a sheet-like body portion, and a plurality of unit optical elements arranged on a light exit-side surface of the body portion along the first direction and each extending in a direction intersecting the first direction, the ratio of a height Hb of each unit optical element to a width Wb of the unit optical element (Hb/Wb) in a cross-section parallel to both a normal direction of the body portion and an arrangement direction of the unit optical elements is not less than 0.55 and not more than 0.85, and wherein when the angular distribution of luminance in a plane parallel to both the front direction and the first direction is measured at a center position in the first direction on the light exit surface of the light guide plate under the following definitions: the front direction is 0°, an angle between the front direction and a direction inclined from the front direction toward one side in the first direction is a negative value, and an angle between the front direction and a direction inclined from the front direction toward the other side in the first direction is a positive negative, a peak angle that gives the maximum luminance in the angular distribution of luminance, attributable to the first light component emitted by the first light source, on the light exit surface of the light guide plate is not less than 65° and not more than 75°, and a peak angle that gives the maximum luminance in the angular distribution of luminance, attributable to the second light component emitted by the second light source, on the light exit surface of the light guide plate is not less than −75° and not more than −65°.

In a preferred embodiment of the present invention, the surface light source device further comprises a light control sheet disposed on a light exit side of the light guide plate, wherein the light control sheet has a sheet-like body portion, and a plurality of unit optical elements arranged on a light entrance-side surface of the body portion along the first direction and each extending in a direction intersecting the first direction, the ratio of a height Hc of each unit optical element to a width Wc of the unit optical element (Hc/Wc) in a cross-section parallel to both a normal direction of the body portion and an arrangement direction of the unit optical elements is not less than 0.55 and not more than 0.72, and wherein when the angular distribution of luminance in a plane parallel to both the front direction and the first direction is measured at a center position in the first direction on the light exit surface of the light guide plate under the following definitions: the front direction is 0°, an angle between the front direction and a direction inclined from the front direction toward one side in the first direction is a negative value, and an angle between the front direction and a direction inclined from the front direction toward the other side in the first direction is a positive value, a peak angle that gives the maximum luminance in the angular distribution of luminance, attributable to the first light component emitted by the first light source, on the light exit surface of the light guide plate is not less than 65° and not more than 80°, and a peak angle that gives the maximum luminance in the angular distribution of luminance, attributable to the second light component emitted by the second light source, on the light exit surface of the light guide plate is not less than −80° and not more than −65°.

In a preferred embodiment of the present invention, the surface light source device further comprises a first light source disposed so as to face the side surface, lying on the one side in the first direction, of the light guide plate, wherein when the angular distribution of luminance, attributable to a first light component emitted by the first light source, in a plane parallel to both the front direction and the first direction is measured on the light emitting surface at varying positions along the first direction under the following definitions: the front direction is 0°, an angle between the front direction and a direction inclined from the front direction toward one side in the first direction is a negative value, and an angle between the front direction and a direction inclined from the front direction toward the other side in the first direction is a positive value, a peak angle θa1 that gives the maximum luminance in the angular distribution of luminance, attributable to the first light component, at the first end position on the light emitting surface, a peak angle θb1 that gives the maximum luminance in the angular distribution of luminance, attributable to the first light component, at the second end position on the light emitting surface, and a peak angle θc1 that gives the maximum luminance in the angular distribution of luminance, attributable to the first light component, at the center position on the light emitting surface, satisfy the following relation:

$$\theta b1 < \theta c1 < \theta a1.$$

In a preferred embodiment of the present invention, the surface light source device further comprises a light control sheet disposed on a light exit side of the light guide plate, wherein the light control sheet has a sheet-like body portion, and a plurality of unit optical elements arranged on a light entrance-side surface of the body portion along the first direction and each extending in a direction intersecting the first direction, each unit optical element has a one-side surface lying on one side in the first direction, and an other-side surface lying on the other side in the first direction, wherein the inclination angles of the other-side surfaces are not the same among the unit optical elements, and wherein the other-side surface of any one unit optical element is inclined from the front direction at the same inclination angle as the other-side surface of another unit optical element lying on the other side of the one unit optical element in the first direction, or is inclined from the front direction more than the other-side surface of another unit optical element lying on the other side of the one unit optical element in the first direction.

In a preferred embodiment of the present invention, the surface light source device further comprises a second light source disposed so as to face the side surface, lying on the other side in the first direction, of the light guide plate, wherein when the angular distribution of luminance, attributable to a second light component emitted by the second light source, in a plane parallel to both the front direction and the first direction is measured on the light emitting surface at varying positions along the first direction under the following definitions: the front direction is 0°, an angle between the front direction and a direction inclined from the front direction toward one side in the first direction is a negative value, and an angle between the front direction and a direction inclined from the front direction toward the other side in the first direction is a positive value, a peak angle θa2 that gives the maximum luminance in the angular distribution of luminance, attributable to the second light component, at the first end position on the light emitting surface, a peak angle θb2 that gives the maximum luminance in the angular distribution of luminance, attributable to the second light component, at the second end position on the light emitting surface, and a peak angle θc2 that gives the maximum luminance in the angular distribution of luminance, attributable to the second light component, at the center position on the light emitting surface, satisfy the following relation:

$$\theta b2 < \theta c2 < \theta a2.$$

In a preferred embodiment of the present invention, the surface light source device further comprises a light control sheet disposed on a light exit side of the light guide plate, wherein the light control sheet has a sheet-like body portion, and a plurality of unit optical elements arranged on a light entrance-side surface of the body portion along the first direction and each extending in a direction intersecting the first direction, each unit optical element has a one-side surface lying on one side in the first direction, and an other-side surface lying on the other side in the first direction, wherein the inclination angles of the one-side surfaces are not the same among the unit optical elements, wherein the inclination angles of the other-side surfaces are not the same among the unit optical elements, wherein the one-side surface of any one unit optical element is inclined from the front direction at the same inclination angle as the one-side surface of another unit optical element lying on the one side of the one unit optical element in the first direction, or is inclined from the front direction more than the one-side surface of another unit optical element lying on the one side of the one unit optical element in the first direction, and wherein the other-side surface of any one unit optical element is inclined from the front direction at the same inclination angle as the other-side surface of another unit optical element lying on the other side of the one unit optical element in the first direction, or is inclined from the front direction more than the other-side surface of another unit optical element lying on the other side of the one unit optical element in the first direction.

In the surface light source device according to the present invention, the peak angle θa and the peak angle θb may satisfy the following relations:

$$\frac{1}{3} \leq \text{Arctan}(|\theta a|) \leq \frac{1}{12}$$

$$\frac{1}{3} \leq \text{Arctan}(|\theta b|) \leq \frac{1}{12}$$

In the surface light source device according to the present invention, the maximum luminance PLVa in the angular distribution of luminance at the first end position on the light emitting surface and the luminance FLVa in the front direction in the angular distribution of luminance at the first end position on the light emitting surface, and the maximum luminance PLVb in the angular distribution of luminance at the second end position on the light emitting surface and the luminance FLVb in the front direction in the angular distribution of luminance at the second end position on the light emitting surface, may satisfy the following relations:

$$0.6 \leq (FLVa/PLVa) < 1$$

$$0.6 \leq (FLVb/PLVb) < 1$$

In the surface light source device according to the present invention, the light guide plate may has a sheet-like base portion including a resin matrix and a diffusing component dispersed in the matrix.

In the surface light source device according to the present invention, the light guide plate may have a sheet-like body portion and a plurality of unit prisms arranged on a light emitting surface-side surface of the body portion along an arrangement direction intersecting the first direction and each extending linearly in a direction intersecting the arrangement direction.

The present invention also provides a liquid crystal display device comprising any one of the above-described surface light source devices, and a liquid crystal display panel disposed on the light exit side of the surface light source device.

In a preferred embodiment of the present invention, the surface light source device includes a light source having a plurality of point-like light emitters arranged along the light entrance surface of the light guide plate, and the liquid crystal display device further comprises a controller for controlling the output of the point-like light emitters of the light source, the controller being configured to adjust the output of each point-like light emitter according to an image to be displayed.

The present invention makes it possible to effectively equalize the in-plane distribution of perceived brightness.

DETAILED DESCRIPTION OF THE PREFERRED INVENTION

Figure 1:
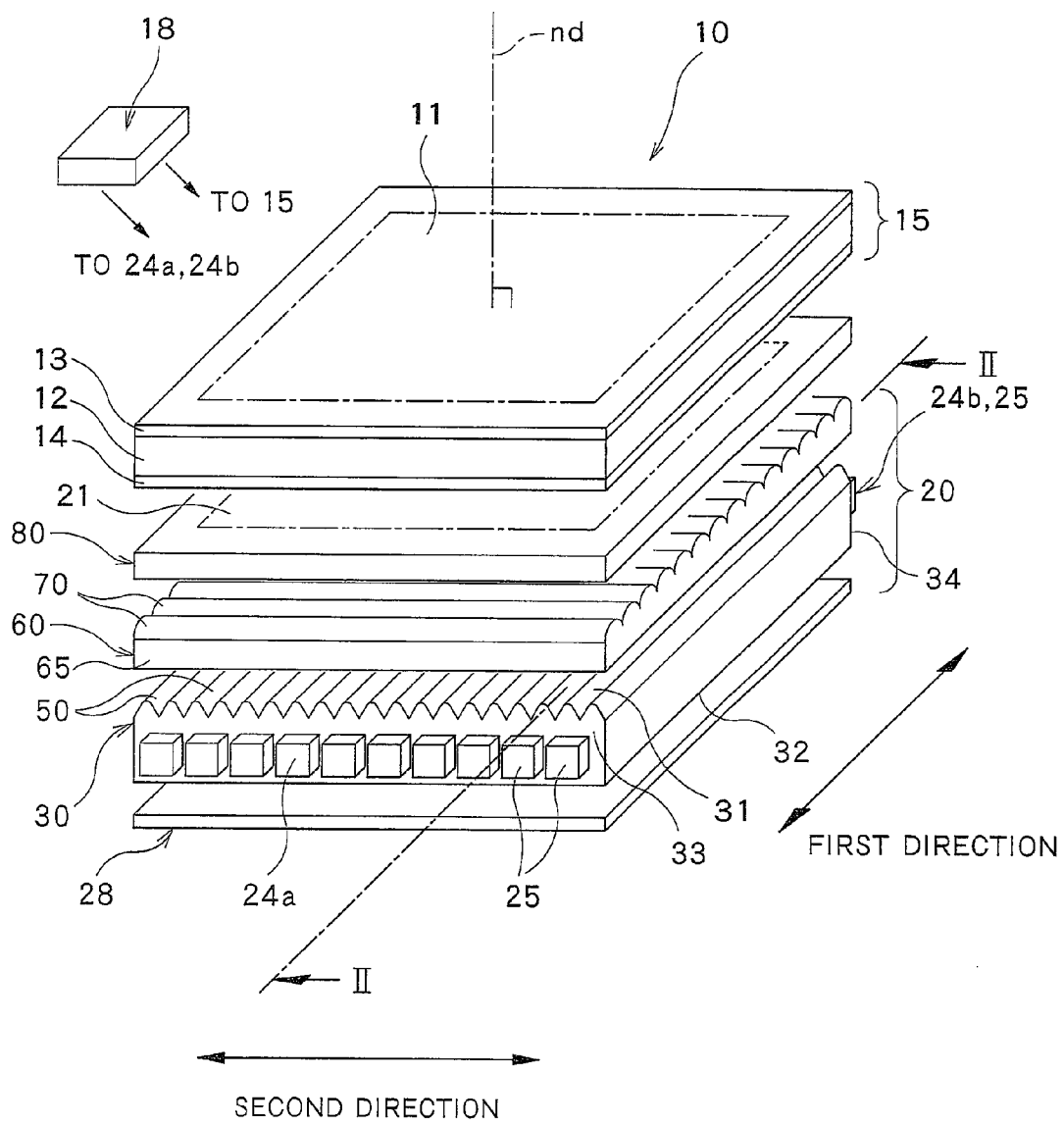
FIG. 1 is a diagram illustrating an embodiment of the present invention, being a perspective view showing the schematic construction of a display device and a surface light source device.

Preferred embodiments of the present invention will now be described with reference to the drawings. In the drawings attached to the present specification, for the sake of illustration and easier understanding, scales, horizontal to vertical dimensional ratios, etc. are exaggeratingly modified from those of the real things.

Figure 2:
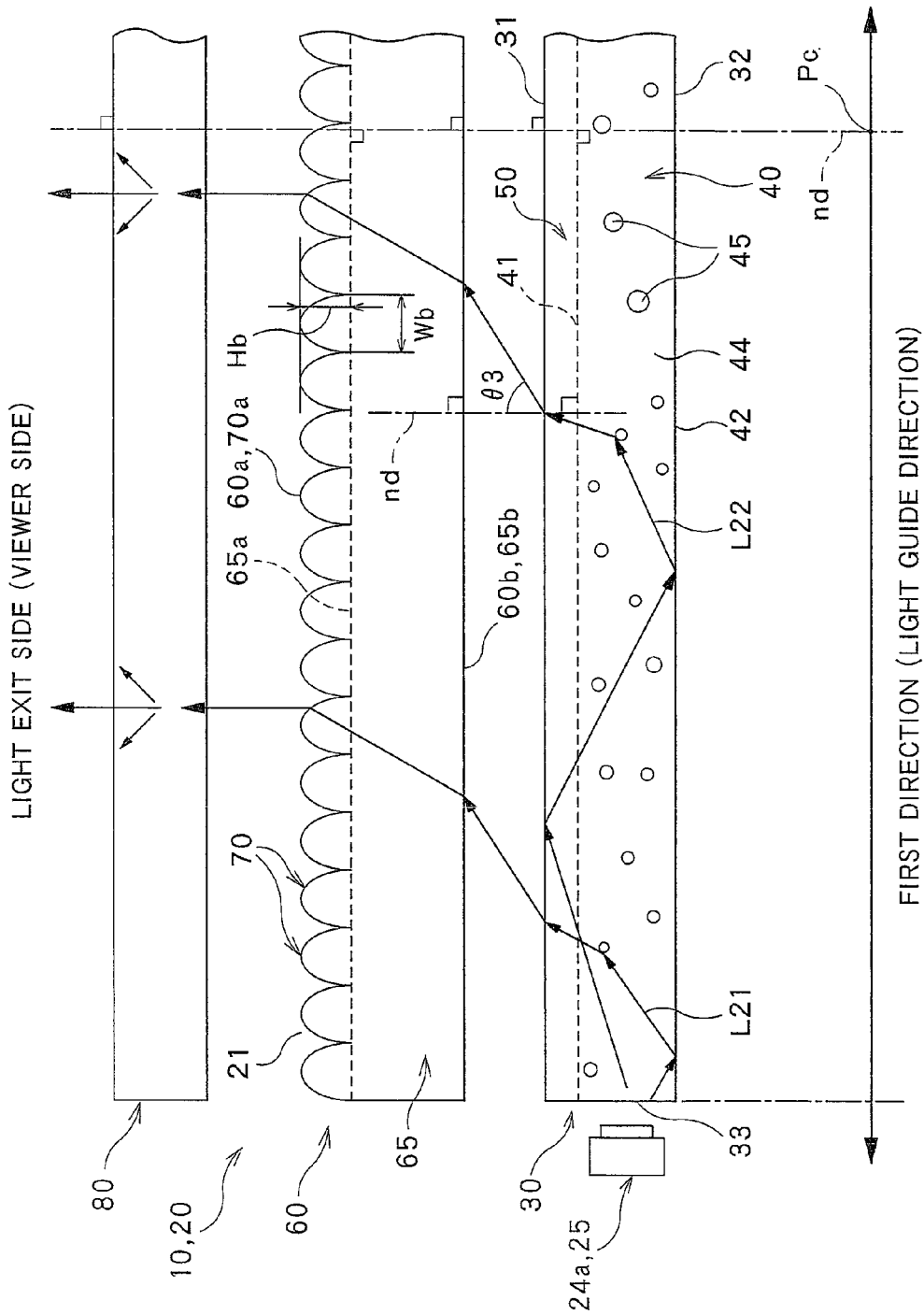
FIG. 2 is a diagram illustrating the action of the surface light source device, being a cross-sectional view taken along the line II-II of FIG. 1.
Figure 3:
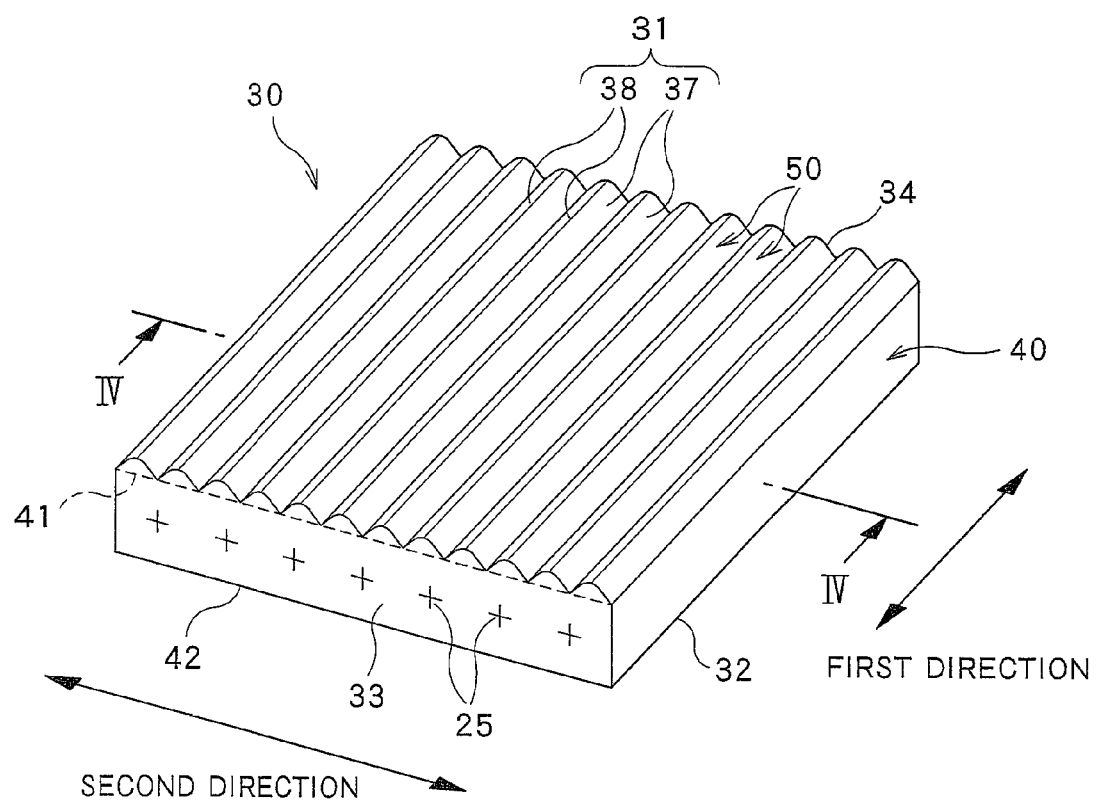
FIG. 3 is a perspective view of a light guide plate incorporated into the surface light source device of FIG. 1.
Figure 4:
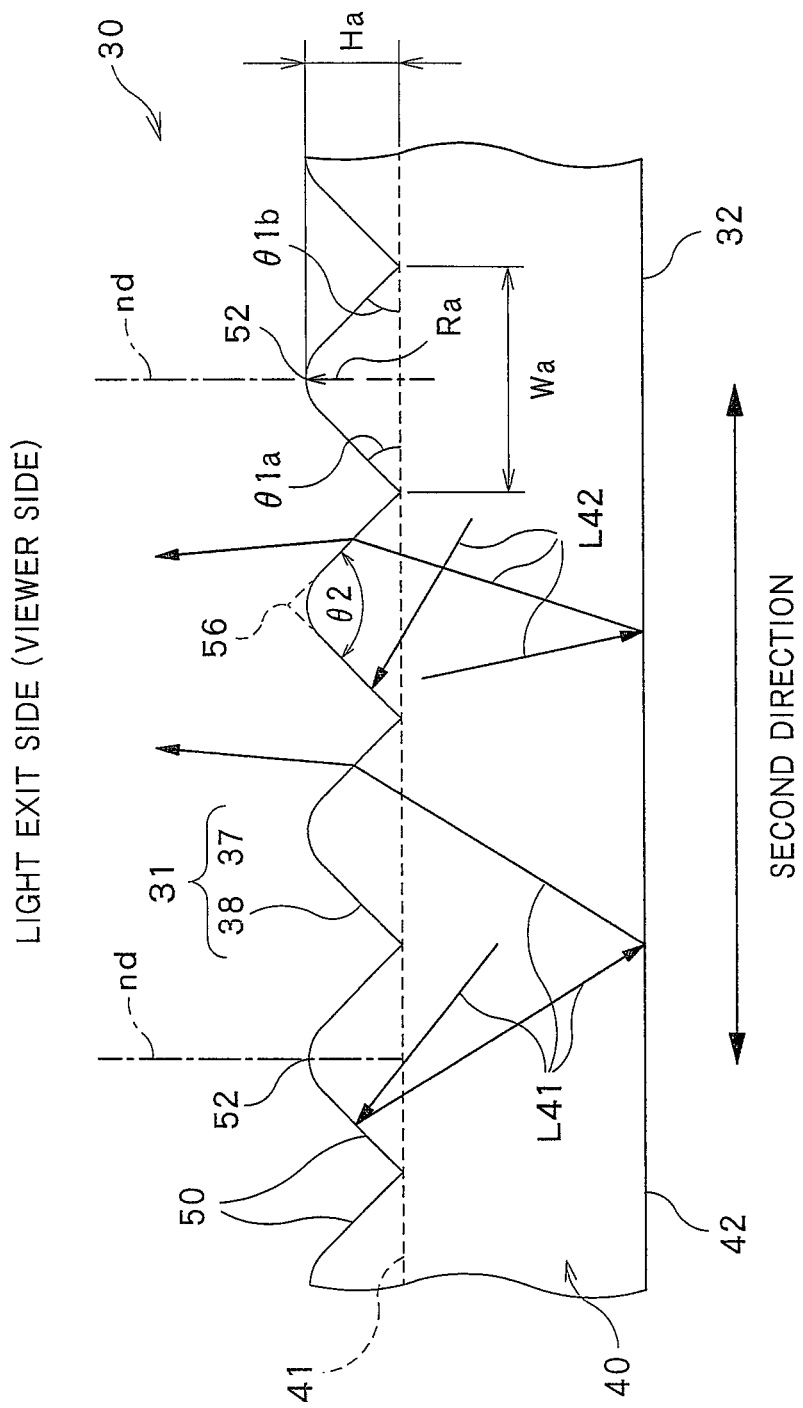
FIG. 4 is a diagram illustrating the action of the light guide plate, showing the light guide plate in the cross-section along the line IV-IV of FIG. 3.
Figure 5:
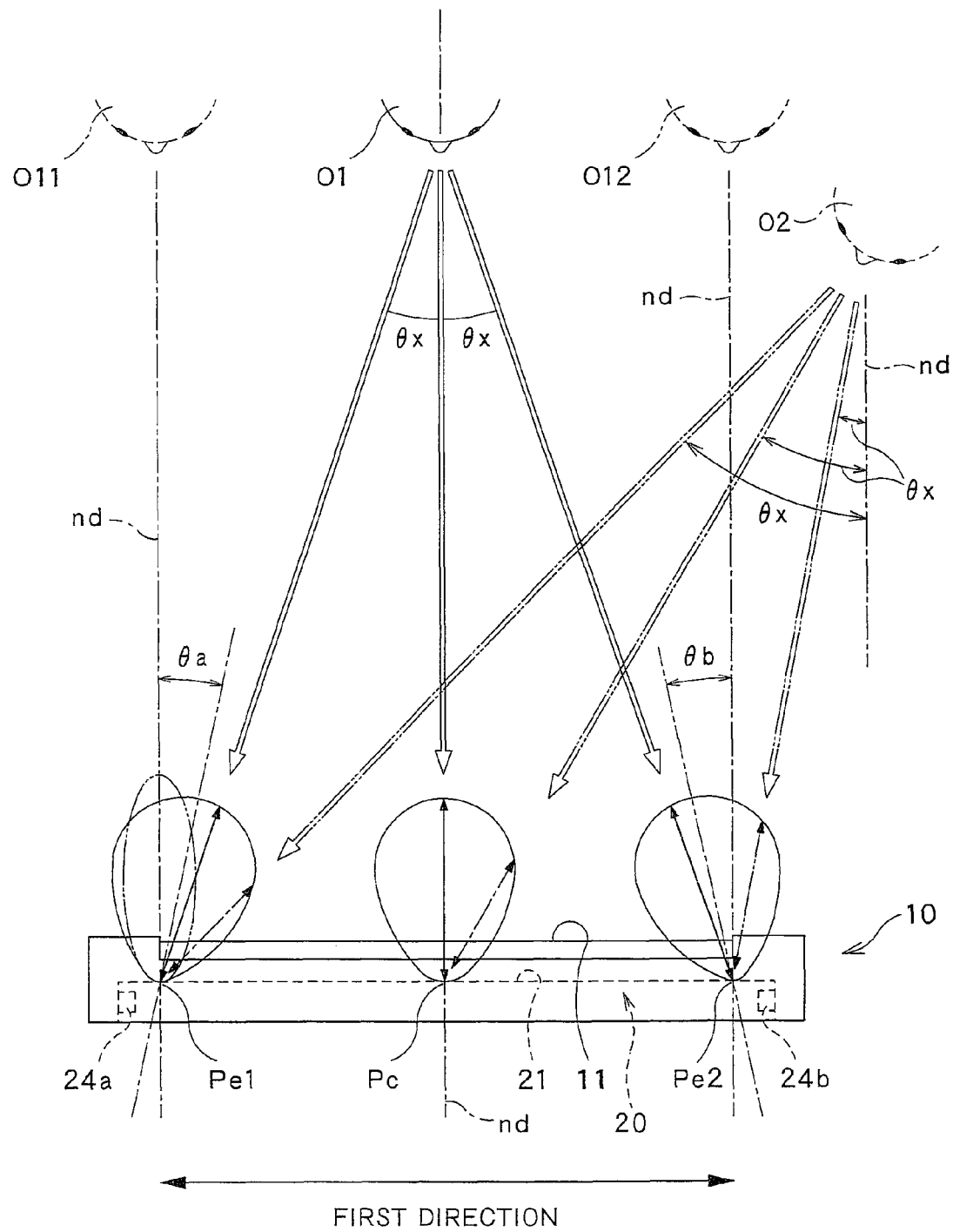
FIG. 5 is a diagram illustrating the action of the display device and the surface light source device upon viewing of the display device of FIG. 1.
Figure 6:
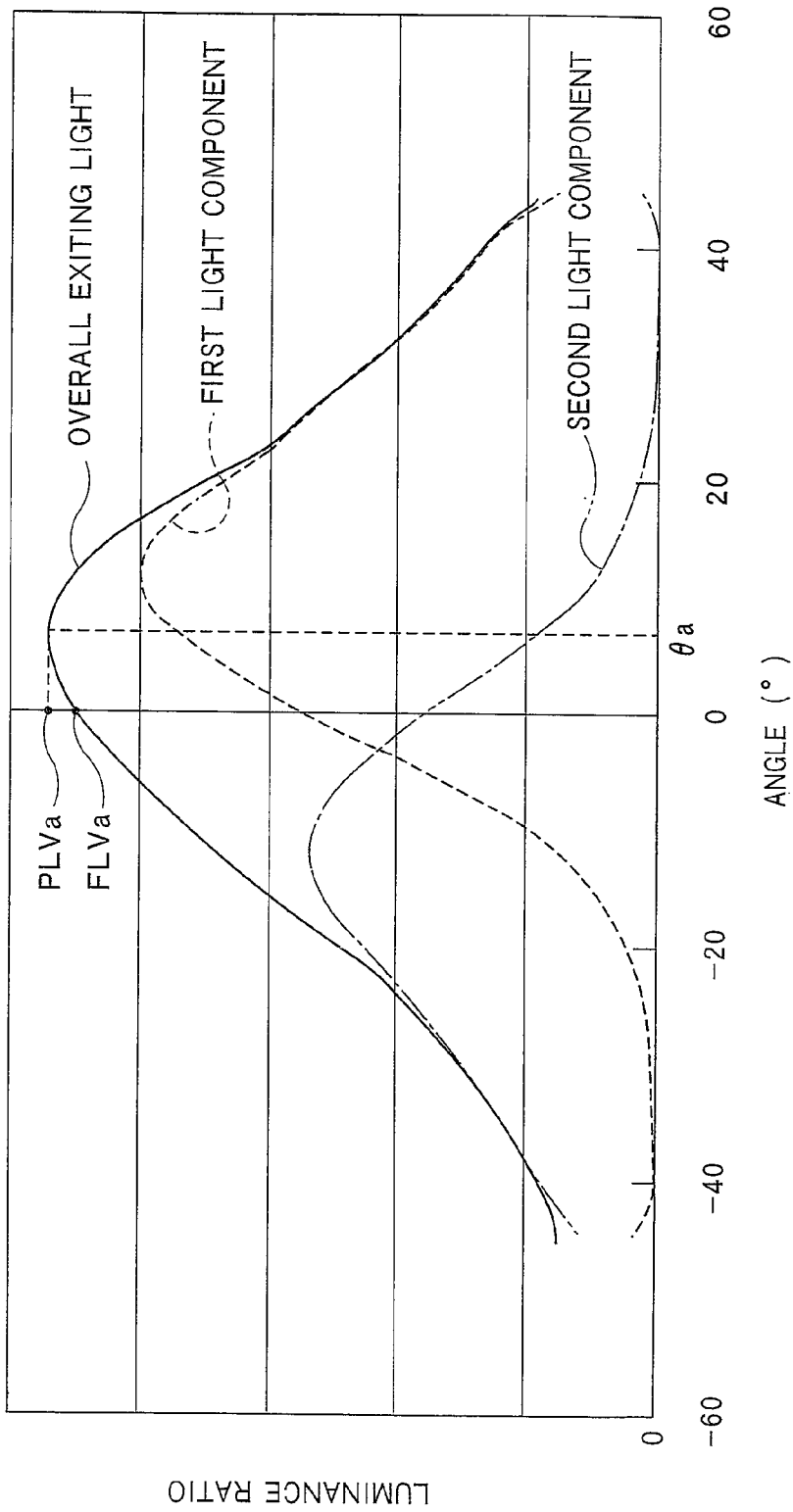
FIG. 6 is a graph showing the angular distribution of luminance at a first end position, one-side end in a first direction (light guide direction), on the light emitting surface of the surface light source device of FIGS. 1 and 2.
Figure 7:
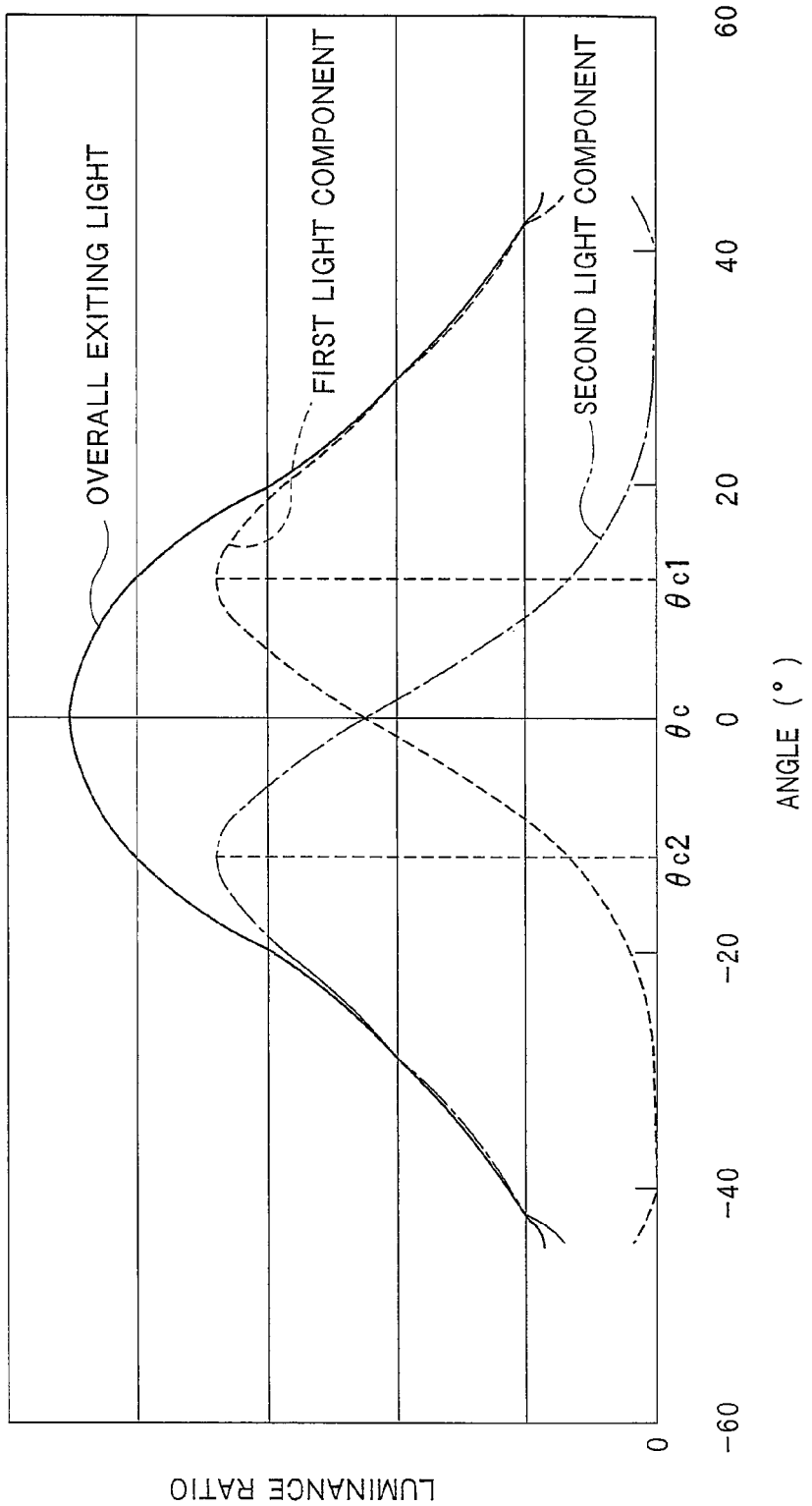
FIG. 7 is a graph showing the angular distribution of luminance at a center position, the center in the first direction (light guide direction), on the light emitting surface of the surface light source device of FIGS. 1 and 2.
Figure 8:
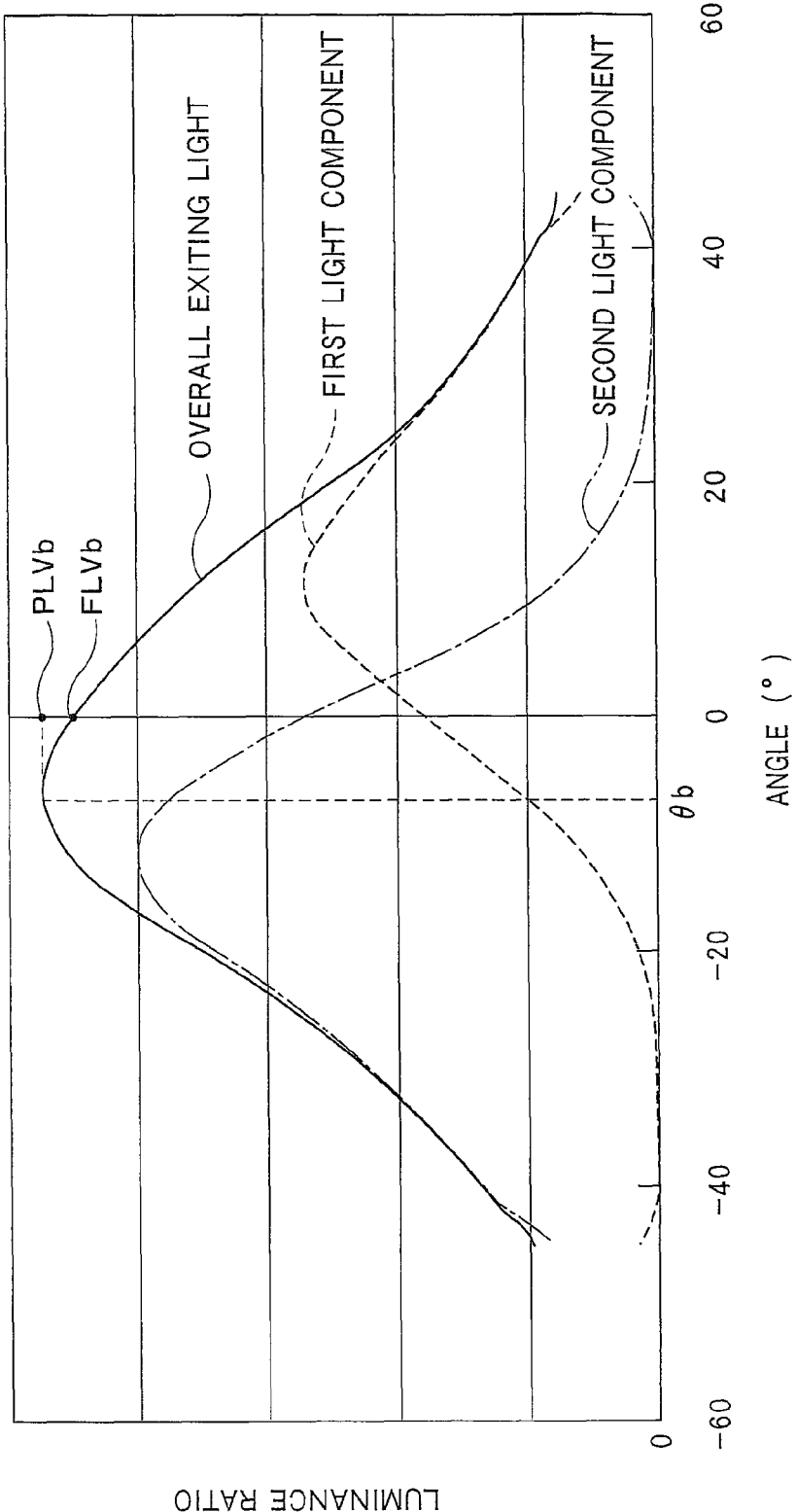
FIG. 8 is a graph showing the angular distribution of luminance at a second end position, the other-side end in the first direction (light guide direction), on the light emitting surface of the surface light source device of FIGS. 1 and 2.

FIGS. 1 through 8 are diagrams illustrating an embodiment of the present invention. Of these, FIG. 1 is a perspective view showing the schematic construction of a liquid crystal display device and a surface light source device, and FIG. 2 is a cross-sectional view illustrating the action of the surface light source device. FIG. 3 is a perspective view of a light guide plate included in the surface light source device, and FIG. 4 is a cross-sectional view showing the light guide plate in the main cross-section. FIG. 5 is a diagram illustrating the action of the display device and the surface light source device upon viewing of the display device. FIGS. 6 through 8 are graphs showing the angular distributions of luminance, measured at varying positions on the light emitting surface (the effective area in the outermost light exit surface) of the surface light source device of FIG. 1.

As shown in FIG. 1, the display device 10 includes a liquid crystal display panel 15, a surface light source device 20, disposed at the rear of the liquid crystal display panel 15, for illuminating the liquid crystal display panel 15 from the back, and a controller 18 for controlling the liquid crystal display panel 15 and the surface light source device 20. The display device 10 has a display surface (the area surrounded by the dashed line in FIG. 1) as an effective screen (effective area) which is not covered e.g. by a chassis or a casing and can effectively display an image. The liquid crystal display panel 15 is configured to function as a shutter which controls transmission and blocking of light from the surface light source device 20 for each pixel to display an image on the display surface 11.

The illustrated liquid crystal display panel 15 includes an upper polarizing plate 13 disposed on the light exit side, a lower polarizing plate 14 disposed on the light entrance side, and a liquid crystal layer 12 disposed between the upper polarizing plate 13 and the lower polarizing plate 14. The polarizing plates 14, 13 function to resolve incident light into two orthogonal polarization components (P wave and S wave), and allow transmission of one polarization component (e.g. P wave) in one direction (direction parallel to the transmission axis) and absorb the other polarization component (e.g. S wave) in the other direction orthogonal to the one direction (parallel to the absorption axis).

An electric field can be applied to each pixel area of the liquid crystal layer 12. The orientation of the liquid crystal layer 12 changes upon the application of electric field. For example, a polarization component in a particular direction, which has passed through the lower polarizing plate 14 disposed on the light entrance side, turns by 90 degrees when it passes through the liquid crystal layer 12 to which an electric field is being applied, whereas the polarization component maintains its polarization direction when it passes through the liquid crystal layer 12 to which no electric field is being applied. Thus, transmission through or absorption and blocking by the upper polarizing plate 13 disposed on the light exit side of the lower polarizing plate 14, of the polarization component which has passed through the lower polarizing plate 14, can be controlled by application or no application of an electric field to the liquid crystal layer 12.

In this manner, the liquid crystal display panel (liquid crystal display panel) 15 can control transmission or blocking of light from the surface light source device 20 for each pixel. The details of the liquid crystal display panel 15 are known from various documents (e.g. "Dictionary of Flat Panel Display", edited by T. Uchida and H. Uchiike, 2001, Kogyo Chosakai Publishing Co., Ltd.), and hence a further detailed description thereof will be omitted.

The surface light source device 20 will now be described. The surface light source device 20 has a light emitting surface (the area surrounded by the dashed line in FIG. 1) 21 which emits light over the area, and in this embodiment is used as a device for illuminating the liquid crystal display panel 15 from the back. The light emitting surface 21 herein refers to a surface which is not covered e.g. by a chassis or casing, and which can effectively emit light according to purposes, i.e. the effective area in the outermost light exit surface of the surface light source device 20. Thus, when the surface light source device 20 is used as a backlight for illuminating the liquid crystal display panel 15 from the back as in this embodiment, the light emitting surface 21 refers to that area in the outermost light exit surface of the surface light source device 20 which faces (in the front direction nd) the area of the display surface 11 of the display device 10.

As shown in FIG. 1, the surface light source device 20 is configured as an edge-light type surface light source device, and includes a light guide plate 30, light sources 24a, 24b disposed lateral to the light guide plate 30, a light control sheet 60 and a reflective sheet 28, both disposed so as to face light guide plate 30, and a light diffusion sheet 80 disposed so as to face the liquid crystal display panel. The light emitting surface 21 is defined by that area in the light exit surface of the light diffusion sheet 80 which faces the area of the display surface 11.

In the illustrated embodiment, as with the display surface 11 of the liquid crystal display device 10 and the light emitting surface 21 of the surface light source device 20, the light exit surface 31 of the light guide plate 30 is formed in a square shape. Thus, the light guide plate 30 is a square plate-like member having a pair of the main surfaces (the light exit surface 31 and the back surface 32) and four side surfaces defined between the pair of the main surfaces. Likewise, the light control sheet 60, the reflective sheet 28 and the light diffusion sheet 80 are each a square plate-like member. In this embodiment the light guide plate 30 has a constant cross-sectional shape at varying positions along a first direction.

The light guide plate 30 has the light exit surface 31 which is the main surface on the side of the liquid crystal display panel 15, the back surface 32 which is the other main surface opposite to the light exit surface 31, and the side surfaces extending between the light exit surface 31 and the back surface 32. Of the side surfaces, the two side surfaces that oppose each other in the first direction are light entrance surfaces 33, 34. One of the light entrance surfaces functions as a first light entrance surface 33 and the other one, opposing to the first light entrance surface in the first direction, functions as a second light entrance surface 34. As shown in FIG. 1, a first light source 24a is disposed so as to face the first light entrance surface 33, and a second light source 24b is disposed so as to face the second light entrance surface 34. Light that has entered the light guide plate 30 from one light entrance surface (e.g. the first light entrance surface 33) is guided in the light guide plate 30 approximately along the first direction (light guide direction) connecting the one light entrance surface (e.g. the first light entrance surface 33) and the other light entrance surface (the second light entrance surface 34) that opposes the one light guide surface.

The light control sheet 60 is disposed so as to face the light exit surface 31 of the light guide plate 30, and the reflective sheet 28 is disposed so as to face the back surface 32 of the light guide plate 30. The light diffusion sheet 80 is disposed on the light exit side of the light control sheet 60.

Various types of light emitters, including a fluorescent light such as a linear cold-cathode fluorescent lamp such as a fluorescent tube, point-like LEDs (light emitting diodes), an incandescent bulb, etc., can be used as the first light source 24a and the second light source 24b. In this embodiment the first light source 24a and the second light source 24b are each comprised of a large number of point-like light emitters 25, in particular light emitting diodes (LEDs), arranged side by side along the longitudinal direction of the corresponding light entrance surface 33 or 34. FIG. 3 shows the arrangement of the point-like light emitters 25 constituting the first light source 24a. The controller 18 can control the output of an individual point-like light emitter 25, i.e. turn-on and turn-off of an individual point-like light emitter 25 and/or the luminance of the light emitter 25, independent of the other point-like light emitters.

The reflective sheet 28 is a member which reflects light that has exited the back surface 32 of the light guide plate 30 so that the light will re-enter the light guide plate 30. The reflective sheet 28 may be comprised of a white scattering reflection sheet, a sheet composed of a material having high reflectance, such as a metal, a sheet having a surface film layer of a high-reflectance material (e.g. a metal film), or the like. The reflective sheet 28 is provided to reflect light, leaking from the back surface 32 of the light guide plate 30, back to the light exit side.

The light diffusion sheet 80 is a sheet-like member having a light diffusing function, and diffuses to some extent light whose light axis has been corrected by the light control sheet 60 as described later, thereby adjusting the viewing angle or making the angular distribution of luminance gentler. A resin sheet containing a diffusing component dispersed therein can be used as the light diffusion sheet 80. A light diffusing function can be imparted to the light diffusing sheet 80, comprised of such a resin sheet, e.g. by using a light diffusing component having a different refractive index from that of the base resin, or by using a light diffusing component which is a high-reflectance material.

The term "light exit side (light outgoing side, light emerging side)" herein refers to downstream side (viewer side, upper side e.g. in FIG. 1) in the travel direction of light that travels from the light sources 24a, 24b toward a viewer, passing through the light guide plate 30, the light control sheet 60, etc., without turning back. The term "light entrance side (light incident side, light inputting side)" herein refers to upstream side in the travel direction of light that travels from the light emitters 25 of the light sources 24a, 24b toward a viewer, passing through the light guide plate 30, the light control sheet 60, etc., without turning back.

The terms "sheet", "film" and "plate" are not used herein to strictly distinguish them from one another. Thus, the term "sheet" includes a member which can also be called a film or plate.

The term "sheet plane (plate plane, film plane)" herein refers to a plane which coincides with the planar direction of an objective sheet-like member when taking a perspective and overall view of the sheet-like member. In this embodiment the plate plane of the light guide plate 30, the sheet plane of the light control sheet 60, the sheet plane of the light diffusion sheet 80, the sheet plane of the reflective sheet 28, the panel plane of the liquid crystal display panel, the display surface 11 of the display device 10 and the light emitting surface 21 of the surface light source device 20 are parallel to each other. The term "front direction" herein refers to the normal direction nd of the light emitting surface 21 of the surface light source device 20, and in this embodiment coincides with the normal direction of the plate plane of the light guide plate 30, the normal direction of the sheet plane of the light control sheet 60, the normal direction of the light diffusion sheet 80, the normal direction of the display surface 11 of the display device 10, etc. (see e.g. FIG. 2).

The light guide plate 30 will now be described in greater detail mainly with reference to FIGS. 2 through 4. As well shown in FIGS. 2 through 4, the light guide plate 30 comprises a plate-like base portion 40 and unit prisms 50 formed on the one-side surface (viewer-facing surface, light exit-side surface) 41 of the base portion 40. The base portion 40 is a flat plate-like member having a pair of the parallel main surfaces. The other-side surface 42 of the base portion 40, which faces the reflective sheet 28, is the back surface 32 of the light guide plate 30.

The terms "unit optical element", "unit shaped element", "unit prism" and "unit lens" herein refer to an element which functions to exert an optical action, such as refraction or reflection, on light and to thereby change the travel direction of the light, and are not used herein to strictly distinguish them from one another.

As shown in FIG. 2, the base portion 40 comprises a matrix 44 and a diffusing component 45 dispersed in the matrix 44. The diffusing component 45 herein refers to a component which can exert an optical action, such as refraction or reflection, on light traveling in the base portion 40 to change the travel direction of the light. Such a light diffusing effect (light scattering effect) of the light diffusing component 45 can be produced by using, as the light diffusing component 45, a material having a different refractive index from that of the matrix 44, or a material which can exert a reflective action on light. The diffusing component 45 having a different refractive index from that of the matrix 44 may be exemplified by a metal compound or a porous material having pores, or air bubbles. In Figures other than FIG. 2, depiction of the diffusing component 45 is omitted.

The unit prisms 50 provided on the one-side surface 41 of the base portion 40 will now be described. As well shown in FIG. 3, the unit prisms 50 are arranged side by side on the one-side surface 41 of the base portion 40 in the arrangement direction intersecting the first direction and parallel to the one-side surface 41 of the base portion 40. Each unit prism 50 extends linearly on the one-side surface 41 of the base portion 40 in a direction intersecting the arrangement direction.

Particularly in this embodiment, the unit prisms 50 are arranged on the one-side surface 41 of the base portion 40 side by side with no space therebetween in a second direction (arrangement direction) perpendicular to the first direction. Thus, the light exit surface 31 of the light guide plate 30 is constituted by the inclined surfaces 37, 38 of the unit prisms 50. Each unit prism 50 extends in a straight line along the first direction perpendicular to the arrangement direction. Each unit prism 50 has a columnar shape, and has the same cross-sectional shape along the longitudinal direction. Further, in this embodiment all the unit prisms 50 have the same construction. Accordingly, the light guide plate 30 of this embodiment has a constant cross-sectional shape at varying positions along the first direction.

In the cross-section shown in FIG. 3, i.e. the cross-section parallel to both the arrangement direction (second direction) of the unit prisms 50 and the normal direction nd of the one-side surface 41 of the base portion 40 (plate plane of the light guide plate 30) (hereinafter also referred to simply as "main cross-section" of the light guide plate), each unit prism 50 may have a triangular shape whose one side lies on the one-side surface 41 of the base portion 40, or a triangular shape whose one side lies on the one-side surface 41 of the base portion 40 and whose top apex, lying above the base portion 40, of the triangular shape is chamfered. In the illustrated embodiment, the cross-sectional shape of each unit prism 50 in the main cross-section is a triangular shape in which the top apex 56, lying above the base portion 40, is chamfered (see FIG. 4).

In the embodiment shown in FIG. 4, in order to effectively enhance the front-direction luminance and to impart symmetry to the angular distribution of luminance in a plane along the second direction, the cross-sectional shape of each unit prism 50 in the main cross-section of the light guide plate is symmetrical with respect to the front direction nd. Thus, the two base angles $\theta 1a$, $\theta 1b$ (see FIG. 4) of the cross-sectional triangular shape in the main cross-section are equal.

The term "triangular shape" herein includes not only a triangular shape in the strict sense but also a generally-triangular shape that may reflect limitations in production technique, a molding error, etc. Similarly, the terms used herein to specify shapes or geometric conditions, such as "parallel", "perpendicular", "ellipse", "circle", etc., should not be bound to their strict sense, and should be construed to include equivalents or resemblances from which the same optical function or effect can be expected.

The light guide plate 30 having the above construction may have the following dimensions: The width Wa (see FIG. 4) of each unit prism 50 along the plate plane of the light guide plate 30 may be not less than 5 µm and not more than 500 µm, and the height Ha of each unit prism 50 from the one-side surface 41 of the base portion 40 along the normal direction nd of the plate plane of the light guide plate 30 may be not less than 1 µm and not more than 250 µm. When the cross-sectional shape of each unit prism 50 is a triangular shape or a generally-triangular shape having a chamfered top apex, the apex angle $\theta 2$ (see FIG. 4) at the top apex 56 may be not less than 90° and not more than 145°. When the cross-sectional shape of each unit prism 50 is a generally-triangular shape in which the top apex 56 is chamfered, the top portion 52 of each unit prism 50 preferably has, in the main cross-section, a curved shape having a radius of curvature not more than the width Wa of the unit prism 50. The thickness of the base portion 40 may be in the range of 0.5 mm to 6 mm.

As described above, the cross-sectional shape of the light guide plate 30 of this embodiment in the main cross-section is constant at varying positions along the first direction. With reference to a first light component emitted by the light emitters 25 of the first light source 24a and which has entered the light guide plate 30, the amount of light exiting the light exit surface 31 varies at varying positions along the first direction (light guide direction). In particular, the amount of the exiting first light component is considerably lower in a region distant from the first light entrance surface 33 from which the first light component enters the light guide plate 30. On the other hand, in a plane parallel to the front direction nd and to the first direction (light guide direction), i.e. in a plane perpendicular to the main cross-section of the light guide plate, the angular distributions of luminance of the first light component at varying positions along the first direction have approximately the same distribution profile. An angle between the front direction nd and a direction inclined from the front direction nd toward the side of the first light entrance surface 33 (one side) in the first direction is herein defined as a negative angle, while an angle between the front direction nd and a direction inclined from the front direction nd toward the side of the second light entrance surface 34 (the other side) in the first direction is defined as a positive angle. By using the light guide plate 30 having the exemplary shape and dimensions described above, it becomes possible for the angular distribution of luminance of the first light component to have a peak angle, which gives the maximum luminance, between 65° and 80°. The angular distribution of luminance can be made to have a peak angle between 65° and 75° by narrowing down the above-described ranges of dimensions. The angular distribution of luminance of the first light component can be measured when only the light emitters 25 of the first light source 24a are turned on (lit) while the light emitters 25 of the second light source 24b are turned off.

Similarly, with reference to a second light component emitted by the light emitters 25 of the second light source 24b and which has entered the light guide plate 30, the amount of light exiting the light exit surface 31 is not constant at varying positions along the first direction (light guide direction), and is considerably lower in a region distant from the second light entrance surface 34 from which the second light component enters the light guide plate 30. On the other hand, in a plane parallel to the front direction nd and to the first direction (light guide direction), the angular distributions of luminance of the second light component at varying positions along the first direction have approximately the same distribution profile. As described above, an angle between the front direction nd and a direction inclined from the front direction nd toward the side of the first light entrance surface 33 (one side) in the first direction is herein defined as a negative angle, while an angle between the front direction nd and a direction inclined from the front direction nd toward the side of the second light entrance surface 34 (the other side) in the first direction is defined as a positive angle. By using the light guide plate 30 having the exemplary shape and dimensions described above, it becomes possible for the angular distribution of luminance of the second light component to have a peak angle, which gives the maximum luminance, between −80° and −65°. The angular distribution of luminance can be made to have a peak angle between −75° and −65° by narrowing down the above-described ranges of dimensions. The angular distribution of luminance of the second light component can be measured when only the light emitters 25 of the second light source 24b are turned on (lit) while the light emitters 25 of the first light source 24a are turned off.

The thus-constructed light guide plate 30 can be produced e.g. by extrusion or by shaping the unit prisms 50 on a substrate. While a variety of materials can be used for the matrix 44 of the base portion 40 of the light guide plate 30 and for the unit prisms 50, it is preferred to use those materials which are widely used for optical sheets (optical members) to be incorporated into display devices, have excellent mechanical properties, optical properties, stability and processability, and are commercially available at low prices. Examples of such materials include a transparent resin mainly comprising at least one of acrylate, styrene, polycarbonate, polyethylene terephthalate, acrylonitrile, etc., and a reactive resin (e.g. ionizing radiation curable resin) such as an epoxy acrylate resin or a urethane acrylate resin. Particles of a transparent material such as silica (silicon dioxide), alumina (aluminum oxide), an acrylic resin or a polycarbonate resin, having an average particle size of about 0.5 to 100 μm, may be used as the diffusing component 45.

When extrusion is employed to produce the light guide plate 30, the base portion 40 and the unit prisms 50 on the one-side surface 41 of the base portion 40 can be formed integrally. When the light guide plate 30 is produced by extrusion, the unit prisms 50 may be composed of the same resin material as the material of the matrix 44 of the base portion 40, and the same particles as the diffusing component 45 of the base portion 40. The light guide plate 30 may be produced by co-extrusion. In that case, the base portion 40 may be composed of the matrix 44 of a resin material and the diffusing component 45 dispersed in the matrix 44, while the unit prisms 50 may be composed of the same resin material as the material of the matrix 44 of the base portion 40, and particles having a different function from the diffusing component 45 of the base portion 40, or may be composed solely of the same resin material as the material of the matrix 44 of the base portion 40.

The light control sheet 60 will now be described. As shown in FIGS. 1 and 2, the light control sheet 60 comprises a sheet-like body portion 65, and unit optical elements 70 provided on the opposite surface (viewer-facing surface) 65a of the body portion 65 from the surface 65b that faces the light guide plate 30, i.e. on the light exit-side surface 65a of the body portion 65.

As can be seen in FIGS. 1 and 2, the unit optical elements 70 are arranged on the light exit-side surface 65a of the body portion 65 side by side in a direction parallel to the light exit-side surface 65a. Each unit optical element 70 extends linearly on the light exit-side surface 65a of the body portion 65 in a direction intersecting the arrangement direction.

Particularly in this embodiment, the unit optical elements 70 are arranged on the light exit-side surface 65a of the body portion 65 side by side with no space therebetween along the arrangement direction. Thus, the light exit surface 60a of the light control sheet 60 is constituted by the surfaces (light exit surfaces) 70a of the unit optical elements 70. Each unit optical element 70 extends in a straight line along a direction perpendicular to the arrangement direction. Each unit optical element 70 has a columnar shape, and has the same cross-sectional shape along the longitudinal direction. Further, in this embodiment all the unit optical elements 70 have the same construction.

As shown in FIGS. 1 and 2, the light control sheet 60 is positioned with respect to the light guide plate 30 such that when the light control sheet 60 is viewed in the normal direction (front direction in this embodiment) nd of the body portion 65, the arrangement direction of the unit optical elements 70 of the light control sheet 60 is parallel to the first direction.

FIG. 2 shows the light control sheet 60 in the cross-section parallel to both the arrangement direction (parallel to the first direction in this embodiment) of the unit optical elements 70 and the normal direction nd of the light exit-side surface 65a of the body portion 65 (hereinafter also referred to simply as "main cross-section" of the light control sheet). In the cross-section of FIG. 2, each unit optical element 70 has a curved or arcuate contour. Thus, the contour of the unit optical elements 70 in the main cross-section of the light control sheet has the shape of a chain of arcs. Further, in this embodiment, the contour of each unit optical element 70 in the main cross-section of the light control sheet is symmetrical with respect to an axis parallel to the normal direction nd of the body portion 65.

In the light control sheet 60 having the above construction, the ratio of the height Hb to the width Wb (Hb/Wb) (see FIG. 2) in each unit optical element 70 in the main cross-section has a considerable effect on the light condensing properties and the light diffusing properties of the light control sheet 60. In this embodiment, the ratio of the height Hb to the width Wb (Hb/Wb) in each unit optical element 70 is preferably not less than 0.55 and not more than 0.85 from the viewpoint of ensuring the below-described optical effects.

The light control sheet 60 may have the following dimensions: The width Wb (see FIG. 2) of each unit optical element 70 may be not less than 20 μm and not more than 200 μm. The height Hb of each unit optical element 70 from the light exit-side surface 65a of the body portion 65 along the normal direction nd of the sheet plane of the light control sheet 60 may be not less than 14 μm and not more than 160 μm. The thickness of the body portion 65 may be in the range of 0.01 mm to 1 mm. The light control sheet 60 can be produced by using the same material and the same method as described above with reference to the production of the light guide plate 30.

The operation of the thus-constructed display device 10 will now be described.

As shown in FIG. 2, light emitted by the light emitters 25 of the light sources 24a, 24b passes through the light entrance surfaces 33, 34 and enters the light guide plate 30. FIG. 2 illustrates, by way of example, light which comes from the first light source 24a and enters the light guide plate 30 through the first light entrance surface 33. The following description illustrates the operations of the surface light source device 20 and the display device 10 with reference to the exemplary light. The light guide plate 30 is constructed symmetrically with respect to a center position Pc in the first direction. The first light source 24a and the second light source 24b are constructed symmetrically on opposite sides of the light guide plate 30 in the first direction. Likewise, the other components of the surface light source device 20, such as the light control sheet 60, the light diffusion sheet 80 and the reflective sheet 28, and the liquid crystal display panel 15 are symmetrically constructed. Because of the constructional symmetry, the following description holds true for light which comes from the second light source 24b and enters the light guide plate 30 through the second light entrance surface 34.

As shown in FIG. 2, lights L21, L22 that have entered the light guide plate 30 repeat reflection, in particular total reflection at the light exit surface 31 and the back surface 32 due to the difference in refractive index between air and the material of the light guide plate 30, and travels in the first direction (light guide direction) connecting the light entrance surface 33 and the opposite surface (the other light entrance surface) 34 of the light guide plate 30. The base portion 40 of the light guide plate 30 contains the diffusing component 45 dispersed in the matrix. Therefore, as shown in FIG. 2, the travel directions of the lights L21, L22 traveling in the light guide plate 30 are irregularly changed by the diffusing component 45, and the lights sometimes enter the light exit surface 31 at an incident angle which is less than the critical angle for total reflection. Thus, the lights L21, L22 can exit the light exit surface 31 of the light guide plate 30. The lights L21, L22 that have exited the light exit surface 31 travel toward the light control sheet 60 disposed on the light exit side of the light guide plate 30.

Light traveling in the light guide plate 30 can collide with the dispersing component 45, dispersed in the light guide plate 30, in various sections in the light guide plate 30 along the light guide direction. Accordingly, light traveling in the light guide plate 30 exits the light exit surface 31 little by little. Thus, light exits the light exit surface 31 of the light guide plate 30 at varying positions along the light guide direction (first direction).

As described previously, with reference to the first light component emitted by the light emitters 25 of the first light source 24a and which has entered the light guide plate 30, the amount of light exiting the light exit surface 31 varies at varying positions along the first direction (light guide direction). In particular, the amount of the exiting first light component gradually decreases from the end position at the first light entrance surface 33, from which the first light component enters the light guide plate 30, to the center position Pc along the first direction (light guide direction), though the change is not large. The amount of the exiting first light component is considerably lower in a region distant from the first light entrance surface 33, for example, in a region in the vicinity of the second light entrance surface 34. Such change in the amount of the exiting first light component becomes marked as the light emitting surface 21 of the surface light source device 20 becomes larger, i.e. as the display surface 11 of the display device 10 becomes larger.

Similarly, with reference to the second light component emitted by the light emitters 25 of the second light source 24b and which has entered the light guide plate 30, the amount of light exiting the light exit surface 31 changes along the first direction (light guide direction). However, the manner of change in the amount of the exiting second component along the first direction is symmetrical to the manner of change in the amount of the exiting first component along the first direction with respect to the center position Pc. Thus, the amount of the exiting second light component gradually decreases from the side (the other side) of the second light entrance surface 34 to the side (the one side) of the first light entrance surface 33 along the first direction (light guide direction). Therefore, the total amount of light exiting the light exit surface 31 of the light guide plate 30, i.e. the sum of the amount of the exiting first light component and the amount of the exiting second light component, can be made approximately uniform along the first direction. The light guide plate 30, having the opposing light entrance surfaces 33, 34, thus has an approximately uniform distribution of the amount of light, exiting the light exit surface 31 of the light guide plate 30, along the first direction (light guide direction).

The amount of light exiting the light guide plate 30 at varying positions can be measured with a commercially available illuminometer by bringing a sensor of the illuminometer into contact with the light exit surface 31 of the light guide plate 30. The amount of exiting light can be evaluated by the measured illuminance value.

The light exit surface 31 of the illustrated light guide plate 30 is constituted by the unit prisms 50, and the cross-sectional shape of each unit prism 50 in the main cross-section is a triangular shape or a generally-triangular shape whose top apex 56 is chamfered. Thus, the light exit surface 31 is constituted by the inclined surfaces 37, 38 which are inclined with respect to the back surface 32 of the light guide plate 30 (see FIG. 4). Light which totally reflects at the inclined surfaces 37, 38 and travels in the light guide plate 30, and light which passes through the inclined surfaces 37, 38 and exits the light guide plate 30 are subject to the following actions of the inclined surfaces 37, 38. The actions exerted on light which totally reflects at the inclined surfaces 37, 38 and travels in the light guide plate 30 will be described first.

FIG. 4 shows, in the main cross-section of the light guide plate 30, the paths of lights L41, L42 which travel in the light guide plate 30 while repeating total reflection at the light exit surface 31 and the back surface 32. As described above, the inclined surfaces 37, 38, constituting the light exit surface 31 of the light guide plate 30, are the surfaces of the unit prisms 50 having a triangular cross-sectional shape whose top apex is chamfered. The two types of surfaces, the inclined surfaces 37, 38, are inclined toward opposite sides (reverse sides) from the normal direction nd of the one-side surface 41 of the base portion 40. The two types of oppositely inclined surfaces 37, 38 are arranged alternately along the second direction. As shown in FIG. 4, the lights L41, L42, traveling in the light guide plate 30 toward the light exit surface 31 and entering the light exit surface 31, in most cases enters an inclined surface which is inclined toward the opposite direction (reverse direction) to the travel directions of the lights with respect to the normal direction nd of the one-side surface 41 of the base portion 40 in the main cross-section of the light guide plate.

Consequently, as shown in FIG. 4, the lights L41, 42 traveling in the light guide plate 30, in most cases when they totally reflect at the inclined surfaces 37, 38 of the light exit surface 31, reduce their component along the second direction, and can even turn toward the opposite side with respect to the front direction nd in the main cross-section. In this manner, the inclined surfaces 37, 38, constituting the light exit surface 31 of the light guide plate 30, prevent light, emitted radially from a light emitting point, from keeping spreading out in the second direction. Thus, light which has been emitted by the light emitters 25 of the light source 24a or 24b in a direction highly inclined with respect to the first direction and which has entered the light guide plate 30, comes to travel mainly in the first direction while the movement in the second direction is restricted.

Thus, the movement of light in the second direction is restricted, whereas the movement of light in the first direction is promoted. This makes it possible to adjust the distribution of the amount of light, exiting the light exit surface 31 of the light guide plate 30, along the second direction by the construction of the light sources 24a, 24b (e.g. the arrangement of the light emitters 25) or by the outputs of the light emitters 25a. Further, because the movement of light in the first direction is promoted while the movement of light in the second direction is restricted, that is, the linearity of movement of light is enhanced, it becomes possible to prevent a large amount of light from exiting the light guide plate 30 in the vicinities of the light entrance surfaces 33, 34, and to induce light to a central region of the light guide plate 30 in the first direction (light guide direction). This can effectively increase brightness at the center of the display surface 11 where a change in brightness is most perceivable by a viewer.

The optical action of the unit prisms 50 on light which passes though the light exit surface 31 and exits the light guide plate 30 will now be described. As shown in FIG. 4, the lights L41, L42, exiting the light guide plate 30 through the light exit surface 31, are refracted at the light exit-side surface 51 of the unit prisms 50, constituting the light exit surface 31 of the light guide plate 30. Due to the refraction, the lights L41, L42, each traveling in a direction inclined from the front direction nd in the main cross-section, are bent such that the angle of the travel direction (exit direction) of each light with respect to the front direction becomes smaller. Thus, with reference to a light component along the second direction perpendicular to the light guide direction, the travel direction of the transmitted light can be changed toward the front direction nd. The unit prisms 50 thus exert a light condensing effect on a light component along the second direction perpendicular to the light guide direction. In this manner, the exit angle of light exiting the light guide plate 30 is narrowed down into a narrow angular range around the front direction in a plane parallel to the arrangement direction of the unit prisms 50 of the light guide plate 30.

As described above, the exit angle of light exiting the light guide plate 30 is narrowed down into a narrow angular range around the front direction in a plane parallel to the arrangement direction of the unit prisms 50 of the light guide plate 30. On the other hand, in a plane parallel to the first direction (light guide direction), light exiting the light guide plate 30 has a relatively large exit angle θ3 with respect to the front direction nd because light travels in the light guide plate 30 mainly in the first direction. More specifically, the exit angle of the first-direction component of light exiting the light guide plate 30 (angle θ3 formed between the first-direction component of exiting light and the normal direction nd of the plate plane of the light guide plate 30 (see FIG. 2)) is likely to fall within a particular angular range of relatively large angles (for example, the above-described angular range in which the maximum luminance exists between 65° and 80° (or 65° and 75°) or the angular range in which the maximum luminance exists between −80° and −65° (or −75° and −65°) in the light guide plate having the above-described exemplary shape and dimensions).

Light that has exited the light guide plate 30 enters the light control sheet 60. As with the unit prisms 50 of the light guide plate 30, the unit optical elements 70 of the light control sheet 60 exert a light condensing effect on transmitted light through its refraction at the light exit surface 70a of the unit optical elements 70. Light whose travel direction is changed by the light control sheet 60 is a light component parallel to the main cross-section of the light control sheet 60, and thus differs from the light component condensed into the front direction by the light guide plate 30. In particular, the light guide plate 30 condenses light into a narrow angular range around the front direction in a plane parallel to the arrangement direction of the unit prisms 50 of the light guide plate 30, whereas the light control sheet 60 condenses light in a narrow angular range around the front direction nd in a plane parallel to the arrangement direction of the unit optical elements 70 of the light control sheet 60. Accordingly, the front direction luminance, which has been enhanced by the light guide plate 30, is not impaired but can be further enhanced by the optical effect of the light control sheet 60.

Light that has exited the light control sheet 60 enters the lower polarizing plate 14 of the liquid crystal display panel 15. The lower polarizing plate 14 allows one polarization component (P wave in this embodiment) of incident light to pass therethrough and absorbs the other polarization component (S wave in this embodiment). Light that has passed through the lower polarizing plate 14 selectively passes through the upper polarizing plate 13 depending on the application of an electric field to each pixel. By thus selectively transmitting light from the surface light source device 20 for each pixel by means of the liquid crystal display panel 15, a viewer can view an image on the liquid crystal display device 10.

As described above, due to the optical action of the light exit surface 31 of the light guide plate 30, i.e. the light exit-side surface (prism surface) of the unit prisms 50, light that has entered the light guide plate 30 travels mainly in the first direction while the movement in the second direction is restricted. Thus, light emitted by each of the large number of light emitters 25 of the light sources 24a, 24b exits the light exit surface 31 of the light guide plate 30 mainly from a certain area which lies in a certain range in the second direction and extends in the first direction. Therefore, the controller 18 may adjust the output of each light emitter 25 according to an image to be displayed on the display surface 11 of the display device 10.

For example, when no image is to be displayed, in other words, a black is to be displayed in a particular area of the display surface 11 of the display device 10, it is possible to turn off a point-like light emitter 25 which supplies light to that area of the light exit surface 31 of the light guide plate 30 which corresponds to the particular area of the display surface 10. This can solve the conventional problem of poor contrast due to incomplete blocking by the display panel 15 of illuminating light from the surface light source device 20. Further, this can reduce the amount of power, and thus is preferred also from the viewpoint of energy saving.

In addition to the case of displaying a black, it is possible to adjust the output of each point-like light emitter 25 according to an image to be displayed on the display surface 11, thereby adjusting brightness in various areas of the displayed image without solely depending on the display panel 15. This also can enhance the contrast in a displayed image and achieve energy saving.

By the way, as described previously in the column "Description of the Related Art", the conventional edge-light type surface light source device is designed such that in a plane parallel to both the front direction and the light guide direction (first direction), the angular distributions of luminance at varying positions in the light guide direction have the same profile, in particular all have the maximum luminance in the front direction.

However, as the display surface 11 of the display device 10 becomes larger and, accordingly, the light emitting surface 21 of the surface light source device 20 becomes larger, the observation angle θx of a viewer O1 to an image displayed on the display surface 11 can differ considerably among varying positions on the display surface 11, as shown in FIG. 5. For instance, the difference between the observation angle to a center position Pc on the display surface 11 and the observation angle to an end position Pe1 or Pe2 on the display surface 11 can be 10° or more. The observation angle θx herein refers to the angle of a viewer's observation direction toward a point on the display surface 11 with respect to the front direction nd.

Accordingly, in the case where as in a display device incorporating the conventional surface light source device, the angular distributions of luminance on a display surface at varying positions in a direction parallel to the light guide direction are symmetrical with respect to the front direction and have approximately the same tendency (distribution profile) in a plane parallel to both the front direction and the light guide direction, there will be a considerable difference between the perceived brightness of an image displayed at the center position Pc, lying at the center of the display surface 11 in the light guide direction, and the perceived brightness of the image displayed at the end position Pe1 or Pe2, lying at the end of the display surface 11 in the light guide direction. In other words, while such a surface light source device and display device has an approximately uniform distribution of front-direction luminance along the light guide direction, the brightness actually perceived by a viewer varies considerably along the light guide direction.

The surface light source device 10 of this embodiment, on the other hand, is designed such that in a plane parallel to both the front direction nd and the first direction (light guide direction), it exhibits angular distributions of luminance as shown by the solid lines in FIGS. 6 through 8 at varying positions on the light emitting surface 21. The angular distributions of luminance shown in FIGS. 6 through 8 are obtained by a simulation performed on a surface light source device having the construction shown in FIGS. 1 through 4 and having a shape and dimensions in the above-described specific ranges. In the angular distributions shown in FIGS. 6 through 8 as well as in the below-described angular distributions shown in FIGS. 12 through 14 and FIGS. 16 through 18, the front direction nd is defined as 0°, an angle between the front direction nd and a direction inclined from the front direction nd toward the side of the first light source 24a (one side) in a direction parallel to the first direction is defined as a negative angle, while an angle between the front direction nd and a direction inclined from the front direction nd toward the side of the second light source 24b (the other side) in a direction parallel to the first direction is defined as a positive angle.

FIG. 6 shows the angular distribution of luminance at the first end position Pe1, the end position on the side of the first light source (one side) in a direction parallel to the first direction, on the light emitting surface 21. FIG. 8 shows the angular distribution of luminance at the second end position Pe2, the end position on the side of the second light source (the other side) in a direction parallel to the first direction, on the light emitting surface 21. FIG. 7 shows the angular distribution of luminance at the center position Pc, the center position in a direction parallel to the first direction, on the light emitting surface 21. As shown in FIGS. 6 through 8, the peak angle θa that gives the maximum luminance in the angular distribution of luminance at the first end position Pe1 on the light emitting surface 21, the peak angle θb that gives the maximum luminance in the angular distribution of luminance at the second end position Pe2 on the light emitting surface 21, and the peak angle θc that gives the maximum luminance in the angular distribution of luminance at the center position Pc on the light emitting surface 21, satisfy the following formula (1):

$$\theta b < \theta c < \theta a \qquad (1)$$

In the exemplary angular distributions shown in FIGS. 6 through 8, the specific values of the peak angles are as follows: θa=7.5°, θb=−7.5°, θc=0°

Such angular distributions of luminance on the light emitting surface 21 of the surface light source device 20 at the different positions along the first direction (light guide direction) are achieved by adjusting with the light control sheet 60 the above-described directionality of exiting light in the light guide plate 30 of this embodiment, as described below.

As described previously, the light guide plate 30 has the pair of light entrance surfaces 33, 34 that oppose each other in the first direction. Light emitted by the first light source 24a and light emitted by the second light source 24b enter the light entrance surfaces 33 and 34, respectively. Thus, the luminance at the light exit surface 31 of the light guide plate 30 is secured by the first light component emitted by the light emitters 25 of the first light source 24a and the second light component emitted by the light emitters 25 of the second light source 24b. Further, the cross-sectional shape of the light guide plate 30 in the main cross-section is constant along the first direction (light guide direction).

Therefore, in a plane parallel to the front direction and to the first direction (light guide direction), i.e. in a plane perpendicular to the main cross-section of the light guide plate, the angular distributions of luminance, attributable to the first light component, on the light exit surface 31 of the light guide plate 30 at varying positions along the first direction, which can be measured when only the light emitters 25 of the first light source 24a are turned on (lit) while the light emitters 25 of the second light source 24b are turned off, have approximately the same directionality (distribution profile). An angle between the front direction and a direction inclined from the front direction toward the side of the first light source 24a (one side) in the first direction is defined as a negative angle, while an angle between the front direction and a direction inclined from the front direction toward the side of the second light source 24b (the other side) in the first direction is defined as a positive angle. By using the light guide plate 30 having the exemplary shape and dimensions described above, the angular distribution of luminance of the first light component can be adjusted to have a peak angle, which gives the maximum luminance, between 65° and 80°, or between 65° and 75°.

The same holds true for the second light component with regard to the angular distribution of luminance on the light exit surface 31 of the light guide plate 30, except for the symmetry with respect to the center position Pc in the first direction (light guide direction). Thus, in a plane parallel to the front direction and to the first direction (light guide direction), i.e. in a plane perpendicular to the main cross-section of the light guide plate, the angular distributions of luminance, attributable to the second light component, on the light exit surface 31 of the light guide plate 30 at varying positions along the first direction, which can be measured when only the light emitters 25 of the second light source 24b are turned on (lit) while the light emitters 25 of the first light source 24a are turned off, have approximately the same directionality (distribution profile). Further, by using the light guide plate 30 having the exemplary shape and dimensions described above, the angular distribution of luminance of the second light component can be adjusted to have a peak angle, which gives the maximum luminance, between −80° and −65°, or between −75° and −65°.

With reference to light (the first light component and the second light component) that has exited the light guide plate 30, the light axis is corrected by the unit optical elements 70 of the light control sheet 60 in order to enhance the front-direction luminance. The unit optical elements 70 extend linearly in the second direction perpendicular to the first direction and are arranged side by side in the first direction. As described above, those angular distributions of luminance on the light exit surface 31 of the light guide plate 30 at varying positions along the first direction which are attributable to the first light component, constituting a part of light exiting the light guide plate 30, have approximately the same profile. Further, those angular distributions of luminance on the light exit surface 31 of the light guide plate 30 at varying positions along the first direction which are attributable to the second light component, constituting the remaining part of light exiting the light guide plate 30, also have approximately the same profile. Therefore, the light axis of light exiting the light guide plate 30 can be almost arbitrarily controlled with the use of the large number of unit optical elements 70 having the same shape and a simple structure and by adjusting the shape of each unit optical element 70, especially the ratio of the height Hb to the width Wb (Hb/Wb) (see FIG. 2) in each unit optical element 70.

Light whose light axis has been corrected by the light control sheet 60 is diffused by the light diffusion sheet 80 so that the angular distribution of luminance becomes gentler, and reaches the light emitting surface 21. In FIGS. 6-8 as well as in the below-described FIGS. 12-14 and 16-18, the angular distributions of luminance, attributable to the first light component, at the measurement positions are shown by the dotted line, while the angular distributions of luminance, attributable to the second light component, at the measurement positions are shown by the one-dot chain line.

As shown in FIGS. 6 through 8, the first light component, whose angular distribution of luminance on the light exit surface 31 of the light guide plate 30 has a peak angle between 65° and 80° (or between 65° and 75°), and the second light component, whose angular distribution of luminance on the light exit surface 31 of the light guide plate 30 has a peak angle between −80° and −65° (or between −75° and −65°), have been condensed by the light control sheet 60 into the front direction nd. However, the peak angles in the angular distributions of luminance, attributable to the first light component, on the light emitting surface 21 of the surface light source device 20 have not been fully amended to the normal direction nd and take positive values. Further, the peak angles in the angular distributions of luminance, attributable to the second light component, on the light emitting surface 21 of the surface light source device 20 have not been fully amended to the normal direction nd and take negative values. For instance, in the angular distribution of luminance of the first light component at the center position Pc on the light emitting surface 21 of the surface light source device 20 in a plane parallel to both the front direction and the first direction, shown in FIG. 7, the peak angle θc1 that gives the maximum luminance is 12.5°. In the angular distribution of luminance of the second light component at the center position Pc on the light emitting surface 21 of the surface light source device 20 in a plane parallel to both the front direction and the first direction, shown in FIG. 7, the peak angle θc2 that gives the maximum luminance is −12.5°.

As shown also in FIGS. 6 through 8, the angular distributions of luminance, attributable to the first light component, on the light emitting surface 21 at varying positions along the first direction have approximately the same profile. On the other hand, the amount of the first light component exiting the light emitting surface 21 gradually decreases along the first direction from the first end position Pe1 to the second end position Pe2 via the center position Pc. The angular distributions of luminance, attributable to the second light component, on the light emitting surface 21 at varying positions along the first direction also have approximately the same profile. On the other hand, the amount of the second light component exiting the light emitting surface 21 gradually decreases along the first direction from the second end position Pe2 to the first end position Pe1 via the center position Pc.

Thus, the total amount of light exiting the light emitting surface 21, i.e. the sum of the amount of the exiting first light component and the amount of the exiting second light component, can be made approximately constant at varying positions along the light guide direction. On the other hand, the proportion of the first light component in the overall light exiting the light emitting surface 21 gradually decreases along the first direction from the first end position Pe1 to the second end position Pe2 via the center position Pc. In contrast, the proportion of the second light component in the overall light exiting the light emitting surface 21 gradually increases along the first direction from the first end position Pe1 to the second end position Pe2 via the center position Pc. Consequently, the angular distribution of luminance at the first end position Pe1 on the light emitting surface 21 has a profile similar to that of the angular distribution of luminance which is attributable to the first light component, whereas the angular distribution of luminance at the second end position Pe2 on the light emitting surface 21 has a profile similar to that of the angular distribution of luminance which is attributable to the second light component.

As shown in FIGS. 6 through 8, the peak angle that gives the maximum luminance in the angular distribution of luminance, attributable to the first light component, on the light emitting surface 21 is larger than the peak angle that gives the maximum luminance in the angular distribution of luminance, attributable to the second light component, on the light emitting surface 21. Accordingly, the peak angle θc in the angular distribution of luminance on the light emitting surface 21 at the center position Pc where the exiting light contains the first light component and the second light component in about equal amount, is smaller than the peak angle θa in the angular distribution of luminance on the light emitting surface 21 at the first end position Pe1 where the first light component is dominant over the second light component, and is larger than the peak angle θb in the angular distribution of luminance on the light emitting surface 21 at the second end position Pe2 where the second light component is dominant over the first light component. The above-described formula (1) is thus satisfied.

It has been confirmed by the inventors' studies that the formula (1) can be satisfied when in the light control sheet 60 having the above construction, the ratio of the height Hb to the width Wb (Hb/Wb) (see FIG. 2) in each unit optical element 70 is not less than 0.55 and not more than 0.85, and when such light control sheet 60 is used in combination with the light guide plate 30 in which in a plane parallel to both the front direction and the first direction, the peak angle in the angular distribution of luminance, attributable to the first light component, on the light exit surface 31 exists between 65° and 75°, and the peak angle in the angular distribution of luminance, attributable to the second light component, on the light exit surface 31 exists between −75° and −65°.

FIG. 5 shows the display device 10 using the surface light source device 20 which has the luminance characteristics shown in FIGS. 6 through 8 and which satisfy the formula (1). As shown in FIG. 5, in the surface light source device 20 which has the luminance characteristics shown in FIGS. 6 through 8 and which satisfy the formula (1), an image displayed at the center position Pc on the display surface 11 appears brightest when the image is viewed in the front direction.

An image displayed at the first end position Pe1 on the display surface 11 appears brightest not at a position which faces the first end position Pe1 in the front direction (the position of O11 in FIG. 5) but at a position shifted from the position O11 toward the center position Pc side along the first direction. More specifically, an image displayed at the first end position Pe1 on the display surface 11 appears brightest when the image is viewed in a direction inclined from the front direction nd by the peak angle θa shown in FIG. 6. Therefore, an image displayed at the first end position Pe1 on the display surface 11 appears fairly bright when the image is viewed from a position which faces the center position Pc in the front direction nd (position of the viewer O1 in FIG. 5). Thus, a considerable lowering of the perceived brightness of an image displayed at the first end position Pe1 as compared to the perceived brightness of an image displayed at the center position Pc can be prevented.

An image displayed at the second end position Pe2 on the display surface 11 appears brightest not at a position which faces the first end position Pe2 in the front direction (position O12 in FIG. 5) but at a position shifted from the position O12 toward the center position Pc side along the first direction. More specifically, an image displayed at the second end position Pe2 on the display surface 11 appears brightest when the image is viewed in a direction inclined from the front direction nd by the peak angle θb shown in FIG. 8. Therefore, an image displayed at the second end position Pe2 on the display surface 11 appears fairly bright when the image is viewed from a position which faces the center position Pc in the front direction nd (position of the viewer O1 in FIG. 5). Thus, a considerable lowering of the perceived brightness of an image displayed at the second end position Pe2 as compared to the perceived brightness of an image displayed at the center position Pc can be prevented.

Figure 16:
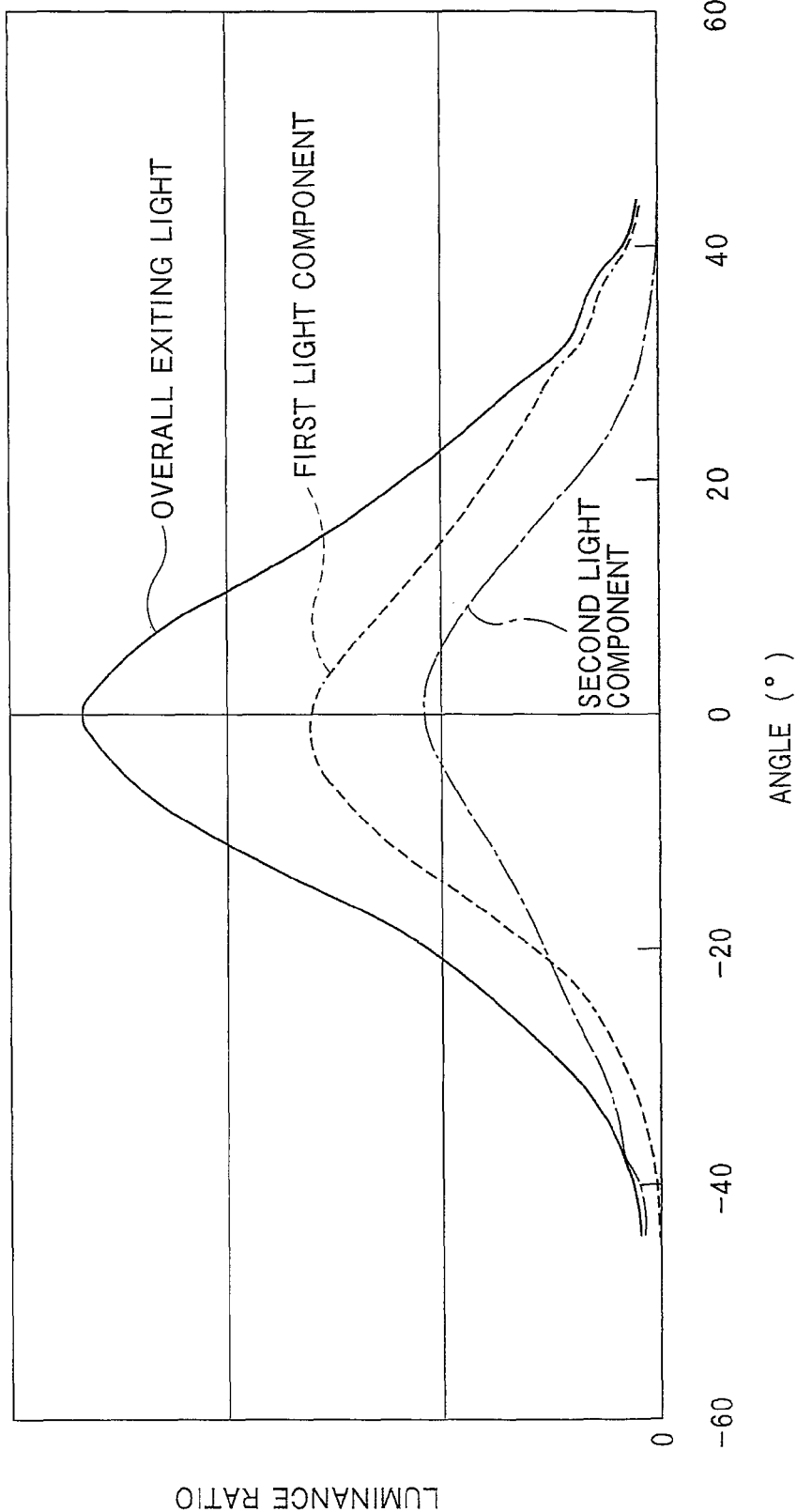
FIG. 16 is a graph corresponding to FIG. 6, showing a comparative example of the angular distribution of luminance on the light emitting surface of a comparative surface light source device.
Figure 17:
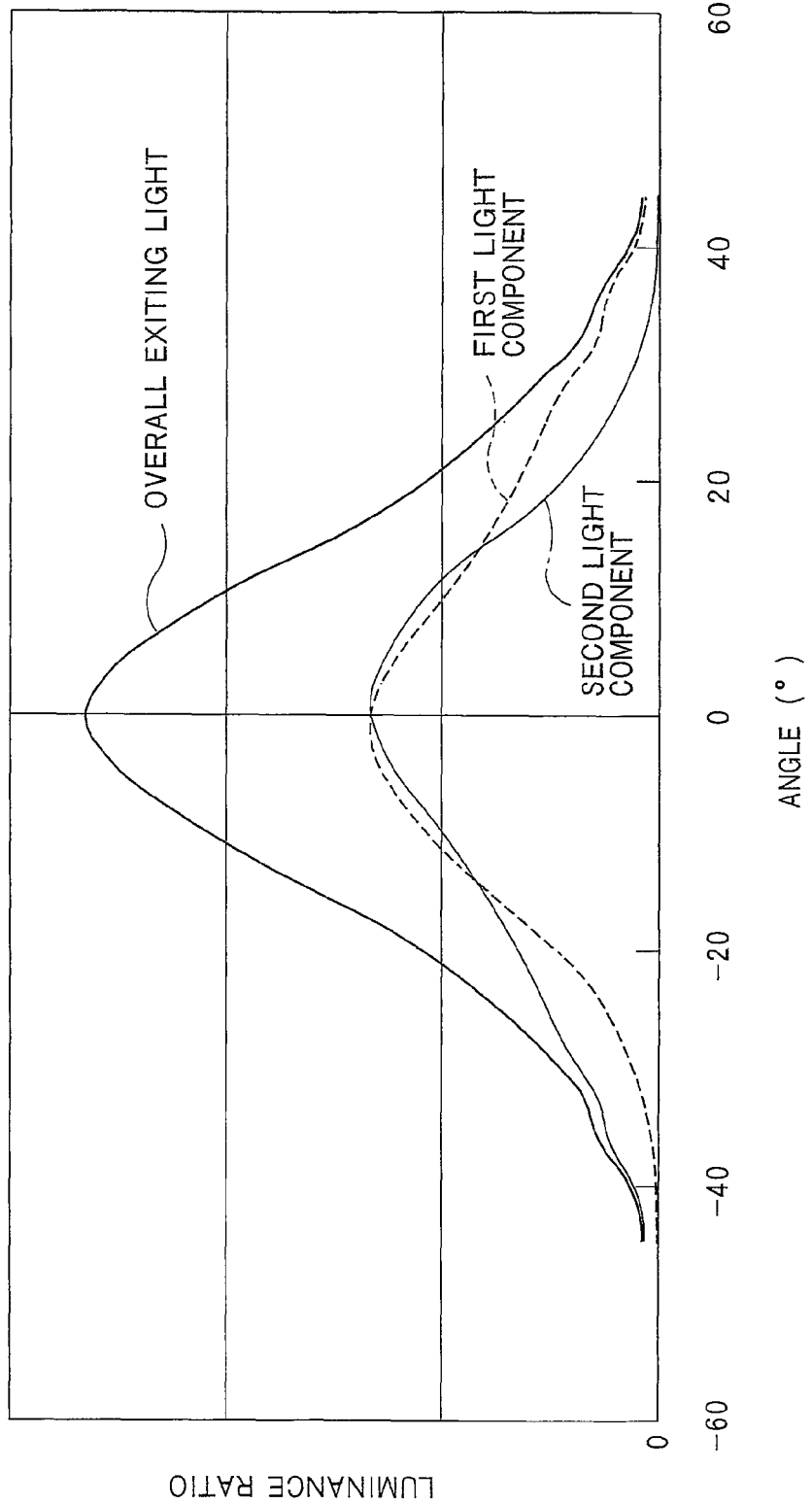
FIG. 17 is a graph corresponding to FIG. 7, showing a comparative example of the angular distribution of luminance on the light emitting surface of the comparative surface light source device.
Figure 18:
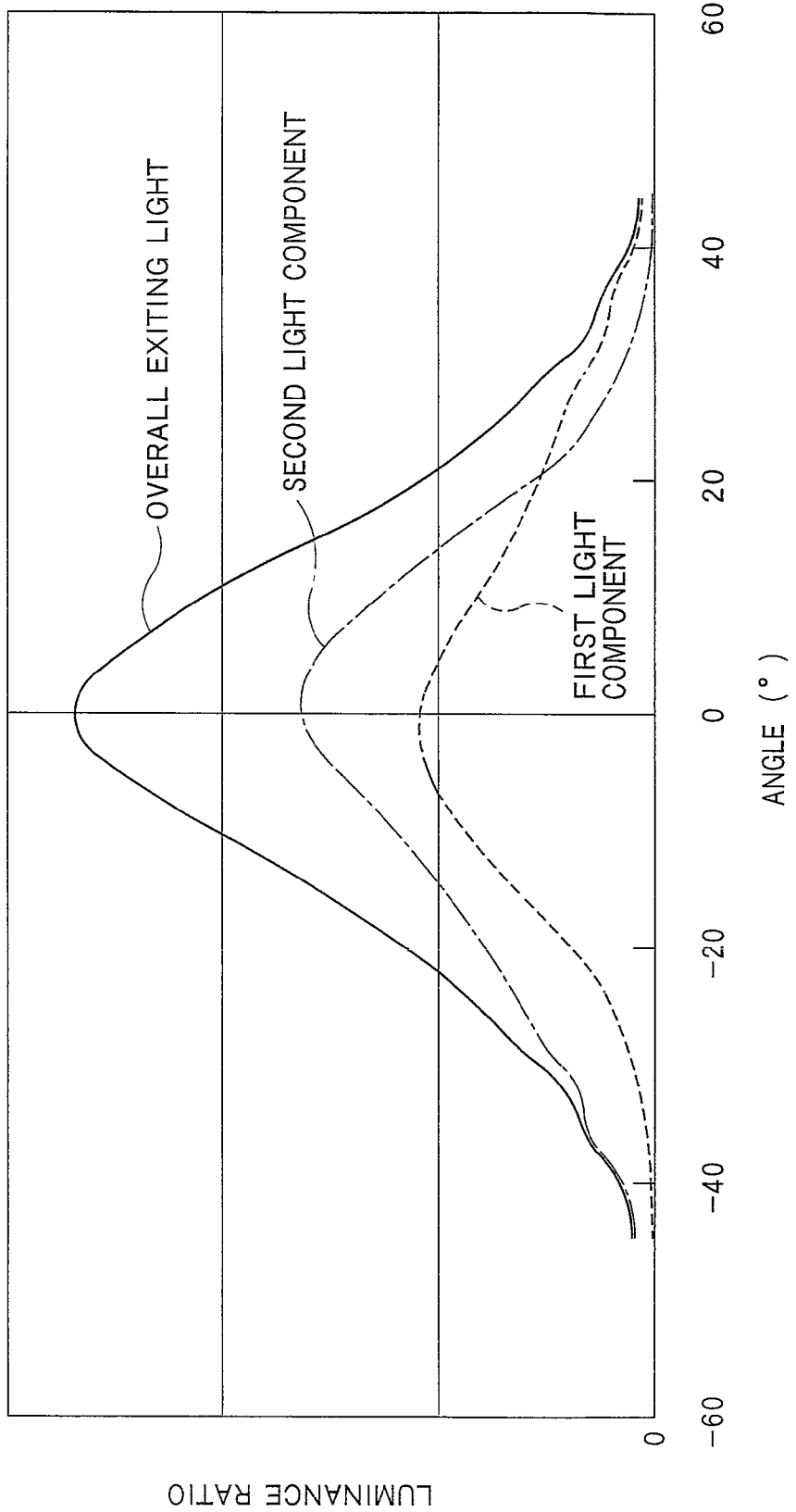
FIG. 18 is a graph corresponding to FIG. 8, showing a comparative example of the angular distribution of luminance on the light emitting surface of the comparative surface light source device.

For comparison with the above-described angular distribution of luminance on the light emitting surface 21 of the surface light source device 20 of this embodiment, FIGS. 16 through 18 show a design of the angular distribution of luminance in which in a plane parallel to both the front direction and the first direction, the angular distribution of luminance, attributable to the first light component, on a light emitting surface and the angular distribution of luminance, attributable to the second light component, on the light emitting surface both have a peak angle in the front direction. Thus, in the comparative examples shown in FIGS. 16 through 18, the angular distributions of luminance, attributable to the overall exiting light, on the light emitting surface of a surface light source device at varying positions along the first direction (light guide direction) all have the maximum luminance in the front direction nd in a plane parallel to both the front direction and the first direction. Further, in the comparative examples shown in FIGS. 16 through 18, compared to the luminance characteristics shown in FIGS. 6 through 8, the half-value angle, which is an angular range in which the luminance is more than one-half of the maximum luminance, is significantly small. The design of angular distribution of luminance shown in FIGS. 16 through 18 thus enables enhancement of the front-direction luminance and equalization of the in-plane distribution of the front-direction luminance.

However, as will be appreciated from the angular distribution of the amount of exiting light (angular distribution of brightness), shown by the two-dot chain line at the first end position Pe1 in the display device 10 in FIG. 5, when the display surface 11 is viewed from a position which faces the center position Pc in the front direction nd (position of the viewer O1 in FIG. 5), an image displayed at the end position Pe1 or Pe2 on the display surface 11 appears considerably darker than an image displayed at the center position Pc. The in-plane variation of perceived brightness is thus large and, therefore, the quality of an image displayed on the display surface 11 is low.

As shown by the two-dot chain lines in FIG. 5, when the viewer O2 views the display surface 11 from a position which is shifted from a position, facing the center position Pc in the front direction nd, toward the second end position Pe2 side along the first direction (light guide direction), the observation angle to the first end position Pe1 becomes very large. As will be appreciated from the angular distributions of the amount of exiting light (angular distributions of brightness) on the display surface 11 at the varying positions along the first direction, shown by the solid lines in FIG. 5, the use of the surface light source device 20 having the luminance characteristics shown in FIGS. 6 through 8 enables the viewer to view the entire image displayed on the entire area of the display surface 11 though the perceived brightness is somewhat low as a whole. On the other hand, the luminance characteristics shown in FIGS. 16 through 18 may make the viewer unable to view an image displayed in a partial area, including the first end position Pe1, of the display surface.

In a full high-definition television which is becoming a standard quality these days, it is recommended for a viewer to view the display surface 11 from a position which is distant from the display surface 11 by a distance equal to three times the length of the long side of the display surface 11 and at which a viewer having a visual acuity of 1.0 is considered to be unable to view an image broken into pixels. In general, a viewer is supposed to view the display surface 11 from a position distant from the display surface 11 by a distance equal to 1.5 to 6 times the width of the display surface 11. It is preferred from this standpoint that an image displayed at the center position Pc on the display surface 11, an image displayed at the first end position Pe1 on the display surface 11 and an image displayed at the second end position Pe2 on the display surface 11 appear brightest to a viewer at such a viewing position. It is thus preferred that the peak angle θa in the angular distribution of luminance at the first end position Pe1 on the light emitting surface 21 in a plane parallel to the front direction and to the first direction, shown in FIG. 5, satisfy the following formula (2), and the peak angle θb in the angular distribution of luminance at the second end position Pe2 on the light emitting surface 21 in a plane parallel to the front direction and to the first direction, shown in FIG. 5, satisfy the following formula (3):

$$\tfrac{1}{3} \le \mathrm{Arctan}(|\theta a|) \le 1;12 \qquad (2)$$

$$\tfrac{1}{3} \le \mathrm{Arctan}(|\theta b|) \le \tfrac{1}{12} \qquad (3)$$

Further, it is preferred that in the angular distribution of luminance of the first light component at the center position Pc on the light emitting surface 21, shown in FIG. 7, the peak angle θc1 that gives the maximum luminance be not less than 5° and not more than 15°. If the angle θc1 is too large, it is possible that the angular distribution of luminance of the overall exiting light at the center position Pc on the light emitting surface 21 may not have a single peak in the front direction nd. If the angle θc1 is too small, the luminance characteristics resemble those shown in FIGS. 16 to 18, making it impossible to effectively equalize the in-plane distribution of perceived brightness. Similarly, it is preferred that in the angular distribution of luminance of the second light component at the center position Pc on the light emitting surface 21, shown in FIG. 7, the peak angle θc2 that gives the maximum luminance be not less than −15° and not more than −5°. If the angle θc2 is too large, the luminance characteristics resemble those shown in FIGS. 16 to 18, making it impossible to effectively equalize the in-plane distribution of perceived brightness. If the angle θc2 is too small, it is possible that the angular distribution of luminance of the overall exiting light at the center position Pc on the light emitting surface 21 may not have a single peak in the front direction nd.

Further, it is preferred that the maximum luminance PLVa in the angular distribution of luminance at the first end position Pe1 on the light emitting surface 21 and the luminance FLVa in the front direction nd in the angular distribution of luminance at the first end position Pe1 on the light emitting surface 21, and the maximum luminance PLVb in the angular distribution of luminance at the second end position Pe2 on the light emitting surface 21 and the luminance FLVb in the front direction nd in the angular distribution of luminance at the second end position Pe2 on the light emitting surface 21, satisfy the following formulae (4) and (5):

$$0.6 \leq (FLVa/PLVa) < 1 \quad (4)$$

$$0.6 \leq (FLVb/PLVb) < 1 \quad (5)$$

When the formulae (4) and (5) are not satisfied, an image displayed at the end positions Pe1, Pe2 can appear dark in the actual use of the display device 10.

According to the embodiment described above, variation in brightness as perceived by a viewer can be effectively reduced. Furthermore, the brightness of an image, perceived by a viewer, can be effectively increased. This enables efficient use of a source light, thus enhancing energy efficiency.

Various changes and modifications may be made to the above-described embodiment. Some variations will now be described with reference to the drawings. In the drawings referred to in the following description, the same symbols are used for the same members or elements as used in the above-described embodiment, and a duplicate description thereof will be omitted.

Figure 9:
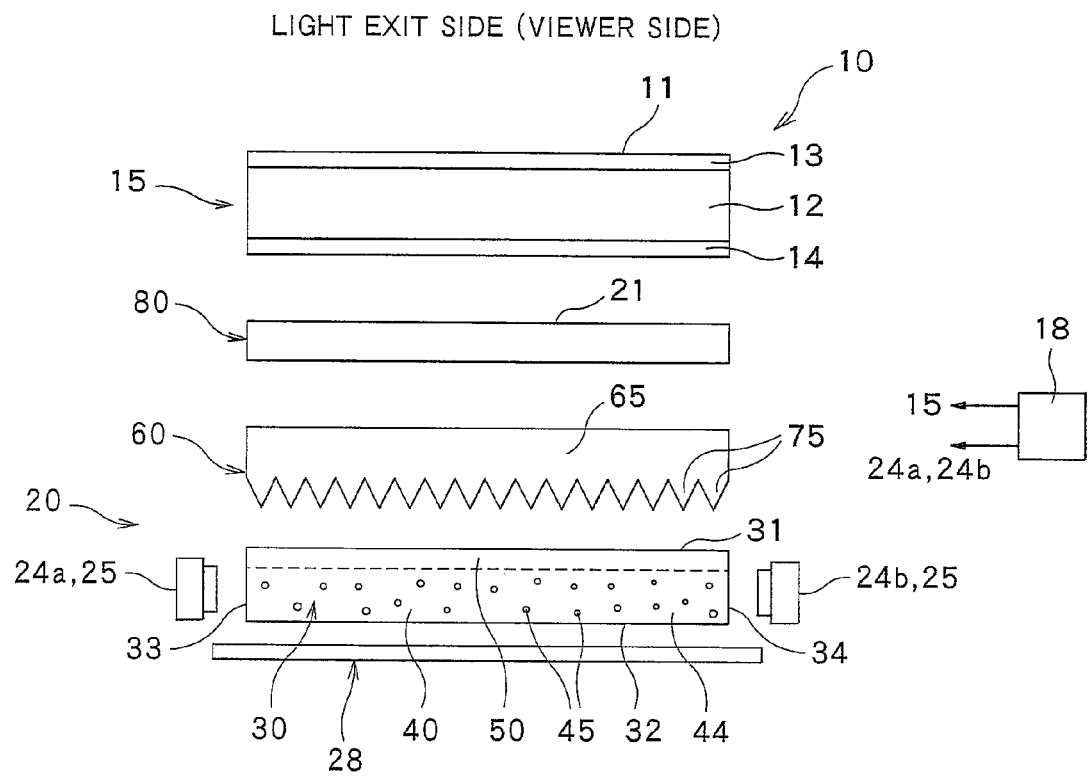
FIG. 9 is a diagram illustrating a variation of the display device and the surface light source device, being a cross-sectional view showing the schematic construction of the variation.
Figure 10:
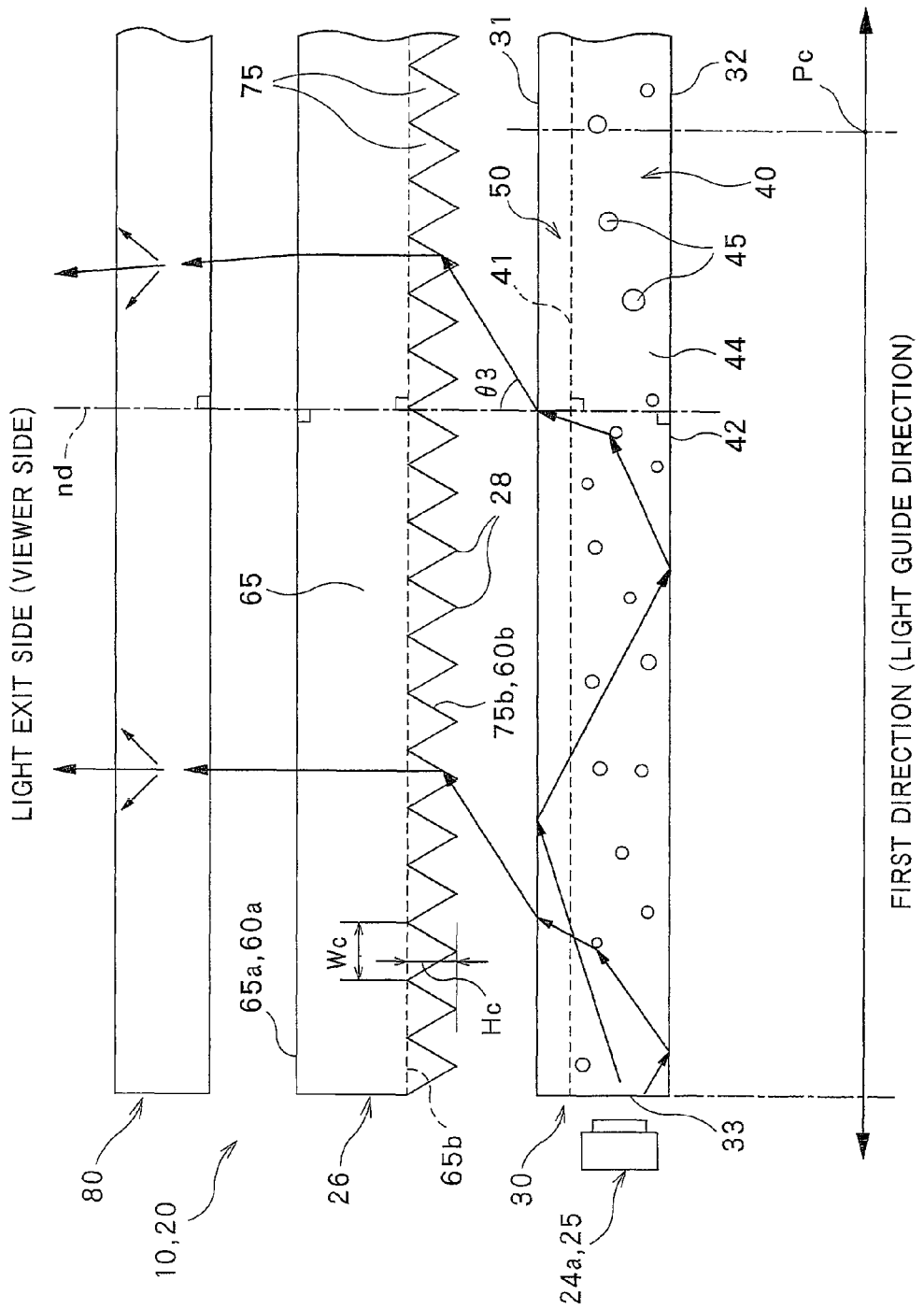
FIG. 10 is a diagram corresponding to FIG. 2, showing the surface light source device in the same cross-section as FIG. 9.

Though in the above-described embodiment the light control sheet 60 comprises the body portion 65 and the unit optical elements 70 provided on the light exit-side surface 65a of the body portion 65 and projecting toward the light exit side, the present invention is not limited to such a light control sheet 60. As shown in FIGS. 9 and 10, the light control sheet 60 may comprise the body portion 65 and unit optical elements 75 provided on the light entrance-side surface 65b of the body portion 65 and projecting toward the light entrance side. Thus, the light control sheet 60 may be constructed as a total reflection-type light condensing sheet. The example shown in FIGS. 9 and 10 will now be described.

The light control sheet 60 shown in FIGS. 9 and 10 will be described first. As can be seen in FIGS. 9 and 10, the unit optical elements 75 are arranged on the light entrance-side surface 65b of the body portion 65 side by side in a direction parallel to the light entrance-side surface 65b. Each unit optical element 75 extends linearly on the light entrance-side surface 65b of the body portion 65 in a direction intersecting the arrangement direction.

Particularly in the illustrated example, the unit optical elements 75 are arranged on the light entrance-side surface 65b of the body portion 65 side by side with no space therebetween along the arrangement direction. Thus, the light entrance surface 60b of the light control sheet 60, which faces the light guide plate 30, is constituted by the prism surfaces (light entrance surfaces) 75b of the unit optical elements 75. Each unit optical element 75 extends in a straight line along a direction perpendicular to the arrangement direction. Each unit optical element 75 has a columnar shape, and has the same cross-sectional shape along the longitudinal direction. Further, in the illustrated example all the unit optical elements 75 have the same construction.

As shown in FIGS. 9 and 10, the light control sheet 60 is positioned with respect to the light guide plate 30 such that when the light control sheet 60 is viewed in the normal direction (front direction in this embodiment) nd of the body portion 65, the arrangement direction of the unit optical elements 75 of the light control sheet 60 is parallel to the first direction.

FIG. 10 shows the light control sheet 60 in the cross-section parallel to both the arrangement direction (parallel to the first direction in this embodiment) of the unit optical elements 75 and the normal direction nd of the light entrance-side surface 65b of the body portion 65 (the main cross-section of the light control sheet). Each unit optical element 75 may have a triangular shape whose one side lies on the light entrance-side surface 65b of the body portion 65, or a triangular shape whose one side lies on the light entrance-side surface 65b of the body portion 65 and whose top apex, lying below the body portion 65, of the triangular shape is chamfered. In the illustrated example, the cross-sectional shape of each unit optical element 75 is a triangular shape projecting from the base portion 65 (see FIG. 10). Further, in the illustrated example, the contour of each unit optical element 75 in the main cross-section of the light control sheet is symmetrical with respect to an axis parallel to the normal direction nd of the body portion 65.

In the light control sheet 60 having the above construction, the ratio of the height Hc to the width Wc (Hc/Wc) (see FIG. 10) in each unit optical element 75 in the main cross-section has a considerable effect on the light condensing properties and the light diffusing properties of the light control sheet 60. In this embodiment, the ratio of the height Hc to the width Wc (Hc/Wc) in each unit optical element 75 is preferably not less than 0.55 and not more than 0.72. It has been confirmed by the inventors' studies that the above-described formula (1) can be satisfied when in the light control sheet 60 having the construction shown in FIGS. 9 and 10, the ratio of the height Hc to the width Wc (Hc/Wc) (see FIG. 10) in each unit optical element 75 is not less than 0.55 and not more than 0.72, and when such light control sheet 60 is used in combination with the light guide plate 30 in which in a plane parallel to both the front direction and the first direction, the peak angle in the angular distribution of luminance, attributable to the first light component, on the light exit surface 31 exists between 65° and 80°, and the peak angle in the angular distribution of luminance, attributable to the second light component, on the light exit surface 31 exists between −80° and −65°. When the formula (1) is satisfied, the same advantageous effects as those of the above-described embodiment can be achieved.

The light control sheet 60 may have the following dimensions: The width Wc (see FIG. 10) of each unit optical element 75 along the sheet plane of the light control sheet 60 may be not less than 10 µm and not more than 500 µm. The height Hc of each unit optical element 75 from the light entrance-side surface 65b of the body portion 65 along the normal direction nd of the sheet plane of the light control sheet 60 may be not less than 6 µm and not more than 500 µm. When the cross-sectional shape of each unit optical element 75 is a triangular shape or a generally-triangular shape having a chamfered top apex, the apex angle at the top apex may be not less than 50° and not more than 65°. The thickness of the body portion 65 may be in the range of 0.01 mm to 1 mm. The light control sheet 60 can be produced by using the same material and the same method as described above with reference to the production of the light guide plate 30.

The light control sheet 60 shown in FIGS. 9 and 10 can achieve the same advantageous effects as those of the above-described embodiment by setting the luminance characteristic on the light exit surface in the same manner. Thus, it is preferred that in a plane parallel to both the front direction and the first direction, the peak angle θa that gives the maximum luminance in the angular distribution of luminance at the first end position Pe1 on the light emitting surface 21 and the peak angle θb that gives the maximum luminance in the angular distribution of luminance at the second end position Pe2 on the light emitting surface 21 satisfy the above-described formulae (2) and (3), respectively. Further, it is preferred that in a plane parallel to both the front direction and the first direction, the peak angle θc1 in the angular distribution of luminance of the first light component at the center position Pc on the light emitting surface 21 be not less than 5° and not more than 15°, and the peak angle θc2 in the angular distribution of luminance of the second light component at the center position Pc on the light emitting surface 21 be not less than −15° and not more than −5°. Further, it is preferred that the above-described formulae (4) and (5) be satisfied.

Another variation will now be described. In the above-described embodiment, in the angular distributions of luminance, attributable to the first light component emitted by the first light source 24a, on the light emitting surface 21 at varying positions along the first direction, the peak angles that give the maximum luminance are approximately the same. Similarly, in the angular distributions of luminance, attributable to the second light component emitted by the second light source 24b, on the light emitting surface 21 at varying positions along the first direction, the peak angles that give the maximum luminance are approximately the same. In addition, the peak angle that gives the maximum luminance in the angular distribution of luminance, attributable to the first light component, on the light emitting surface 21 differs from the peak angle that gives the maximum luminance in the angular distribution of luminance, attributable to the second light component, on the light emitting surface 21. Further, in the above-described embodiment, with respect to the amount of light that exits the light emitting surface, the ratio between the first light component and the second light component changes along the first direction. Such conditions in the above-described embodiment can achieve the luminance characteristics represented by the formula (1) and the attendant advantageous effects. However, the luminance characteristics of the formula (1) can be secured in a manner different from that of the above-described embodiment.

Figure 12:
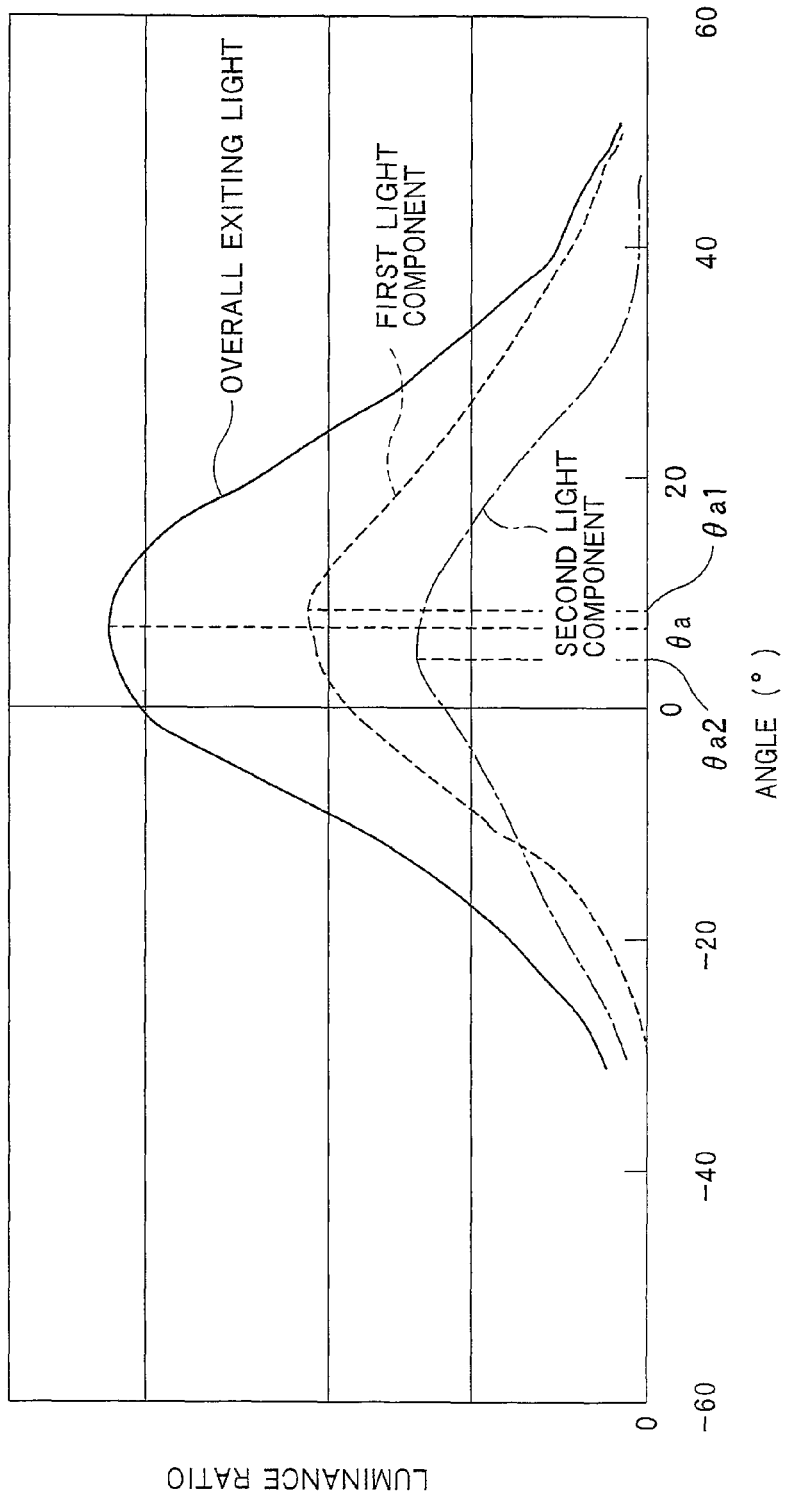
FIG. 12 is a graph showing the angular distribution of luminance at a first end position, one-side end in a first direction (light guide direction), on the light emitting surface of the surface light source device of FIG. 11.
Figure 13:
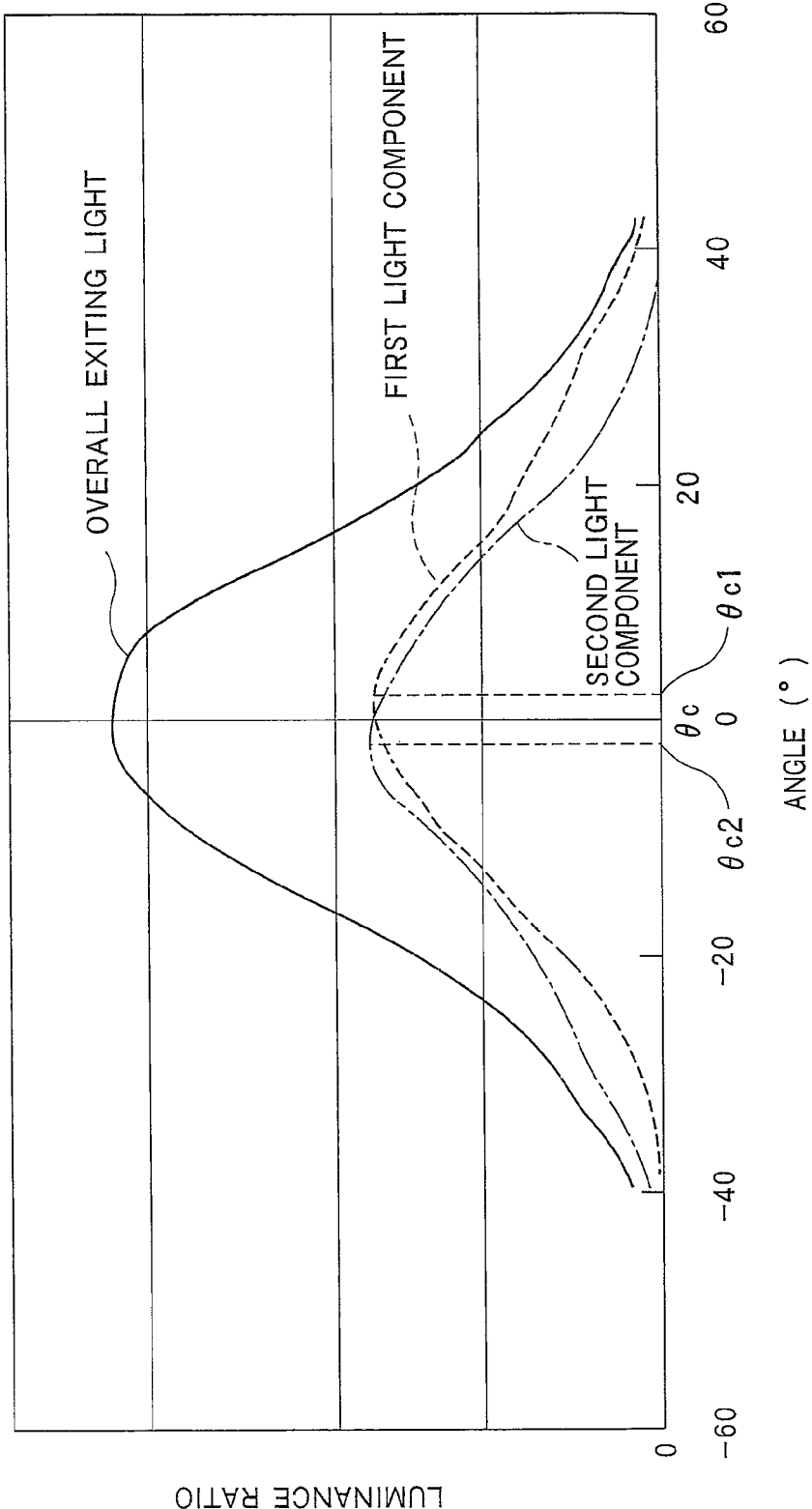
FIG. 13 is a graph showing the angular distribution of luminance at a center position, the center in the first direction (light guide direction), on the light emitting surface of the surface light source device of FIG. 11.
Figure 14:
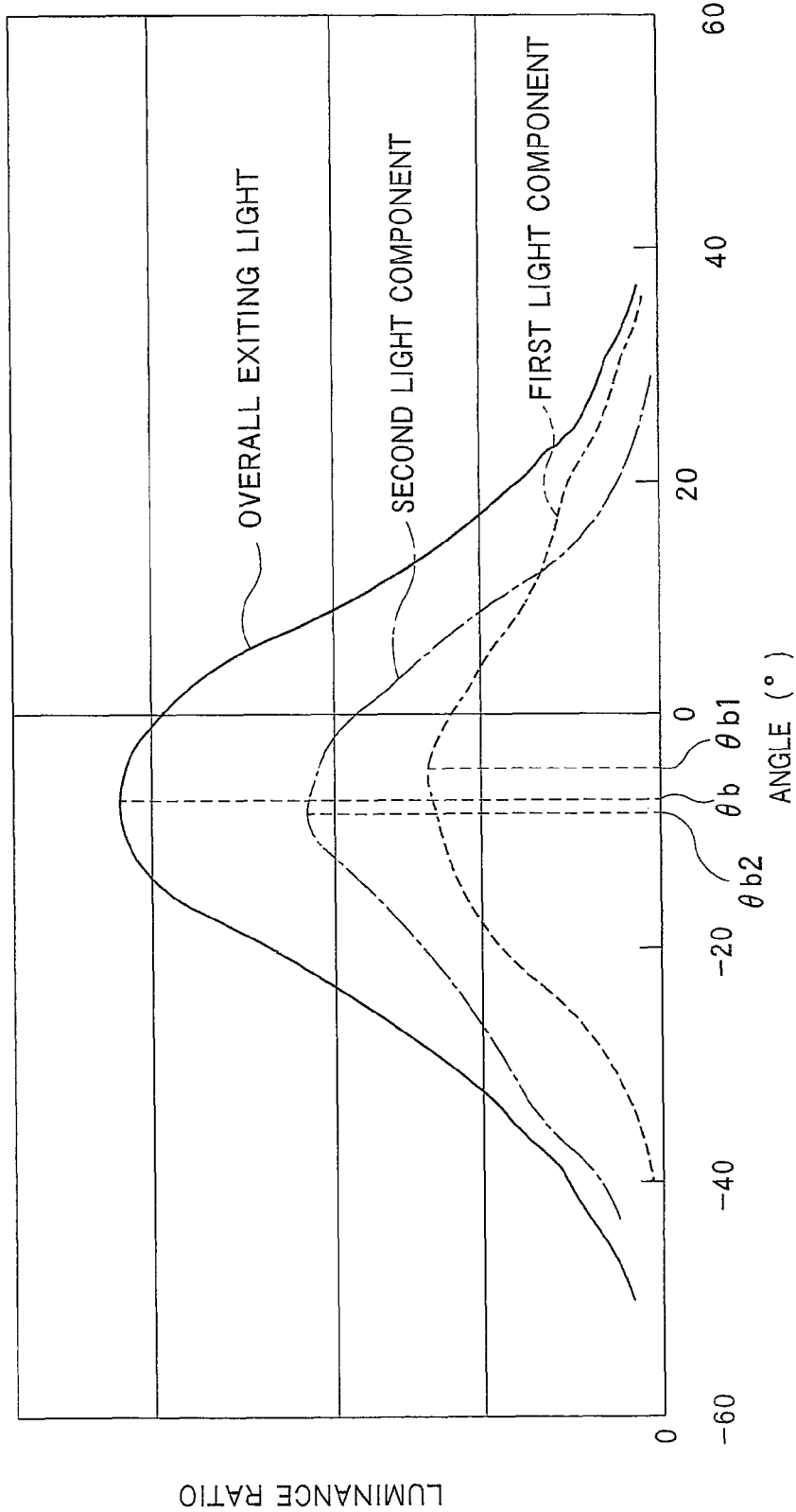
FIG. 14 is a graph showing the angular distribution of luminance at a second end position, the other-side end in the first direction (light guide direction), on the light emitting surface of the surface light source device of FIG. 11.

In the example shown in FIGS. 12 through 14, the peak angle that gives the maximum luminance in the angular distribution of luminance, attributable to the first light component emitted by the first light source 24a, on the light emitting surface 21 varies at different positions on the light emitting surface 21 along the first direction. In particular, when the angular distribution of luminance, attributable to the first light component emitted by the first light source 24a, is measured at varying positions on the light emitting surface 21 along the first direction in a plane parallel to both the front direction and the first direction, the peak angle θa1 that gives the maximum luminance in the angular distribution of luminance, attributable to the first light component, at the first end position Pe1 on the light emitting surface 21, the peak angle θb1 that gives the maximum luminance in the angular distribution of luminance, attributable to the first light component, at the second end position Pe2 on the light emitting surface 21, and the peak angle θc1 that gives the maximum luminance in the angular distribution of luminance, attributable to the first light component, at the center position Pc on the light emitting surface 21, satisfy the following formula (6):

$$\theta b1 < \theta c1 < \theta a1 \qquad (6)$$

Similarly, in the example shown in FIGS. 12 through 14, the peak angle that gives the maximum luminance in the angular distribution of luminance, attributable to the second light component emitted by the second light source 24b, on the light emitting surface 21 varies at different positions on the light emitting surface 21 along the first direction. In particular, when the angular distribution of luminance, attributable to the second light component emitted by the second light source 24b, is measured at varying positions on the light emitting surface 21 along the first direction in a plane parallel to both the front direction and the first direction, the peak angle θa2 that gives the maximum luminance in the angular distribution of luminance, attributable to the second light component, at the first end position Pe1 on the light emitting surface 21, the peak angle θb2 that gives the maximum luminance in the angular distribution of luminance, attributable to the second light component, at the second end position Pe2 on the light emitting surface 21, and the peak angle θc2 that gives the maximum luminance in the angular distribution of luminance, attributable to the second light component, at the center position Pc on the light emitting surface 21, satisfy the following formula (7):

$$\theta b2 < \theta c2 < \theta a2 \qquad (7)$$

In the example shown in FIGS. 12 through 14, the above formula (1) can be satisfied and the above-described advantageous effects can be secured by the combination of such an angular distribution of luminance attributable to the first light component and such an angular distribution of luminance attributable to the second light component.

Figure 11:
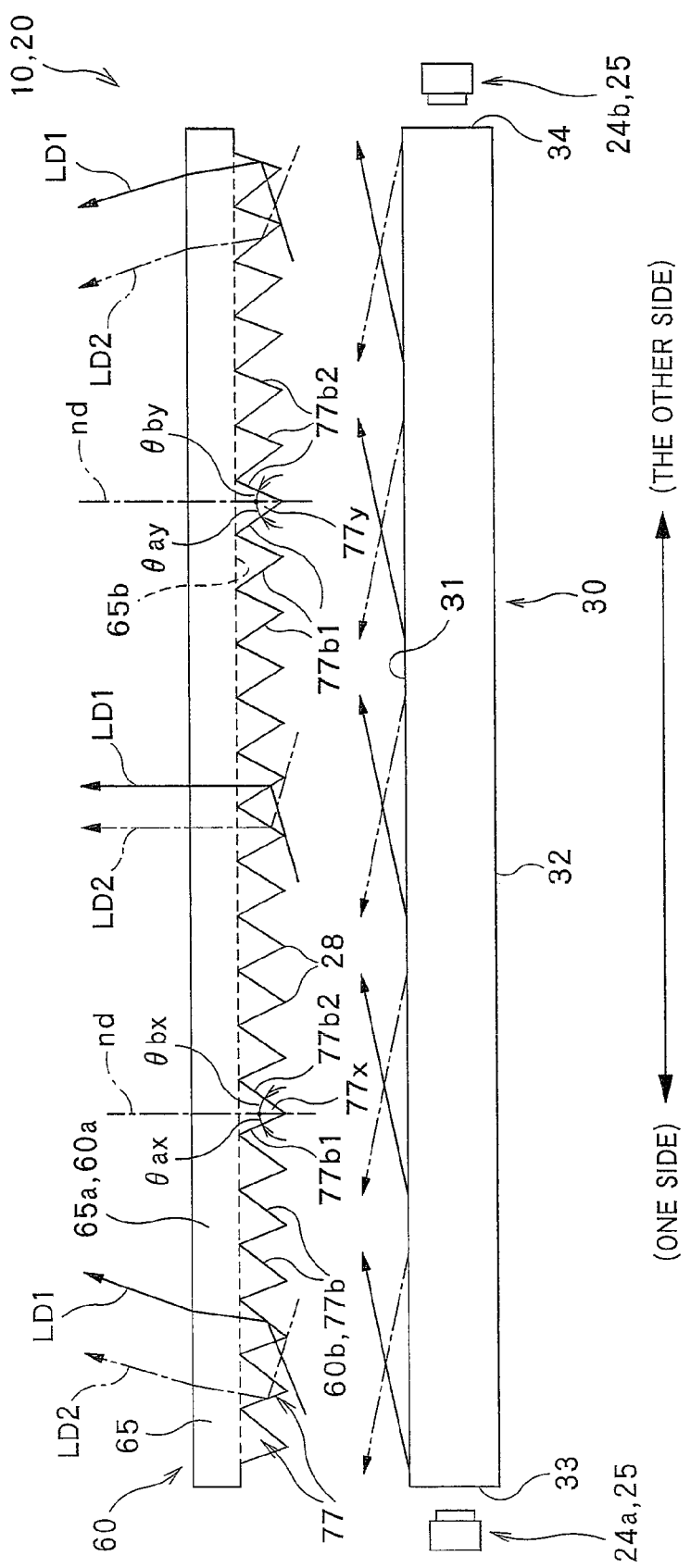
FIG. 11 is a diagram illustrating another variation of the surface light source device in the same cross-section as FIG. 2.

The angular distributions of luminance shown in FIGS. 12 through 14 can be achieved by using the light control sheet 60 shown in FIG. 11. In the above-described embodiment and in the variation shown in FIGS. 9 and 10, the unit optical elements of the light control sheet 60, arranged in the first direction, all have the same construction. The light control sheet 60 shown in FIG. 11, on the other hand, includes unit optical elements 77 of different constructions.

As can be seen in FIG. 11, the unit optical elements 77 are arranged on the light entrance-side surface 65b of the body portion 65 side by side in a direction parallel to the light entrance-side surface 65b. Each unit optical element 77 extends linearly on the light entrance-side surface 65b of the body portion 65 in a direction intersecting the arrangement direction. Particularly in the illustrated example, the unit optical elements 77 are arranged on the light entrance-side surface 65b of the body portion 65 side by side with no space therebetween along the arrangement direction. Thus, the light entrance surface 60b of the light control sheet 60, which faces the light guide plate 30, is constituted by the prism surfaces (light entrance surfaces) 77b of the unit optical elements 77. Each unit optical element 77 extends in a straight line along a direction perpendicular to the arrangement direction. Each unit optical element 77 has a columnar shape, and has the same cross-sectional shape along the longitudinal direction.

As with the example shown in FIGS. 9 and 10, the light control sheet 60 of FIG. 11 is positioned with respect to the light guide plate 30 such that when the light control sheet 60 is viewed in the normal direction (front direction in this embodiment) nd of the body portion 65, the arrangement direction of the unit optical elements 77 of the light control sheet 60 is parallel to the first direction.

FIG. 11 shows the light control sheet 60 in the cross-section parallel to both the arrangement direction (parallel to the first direction in this example) of the unit optical elements 77 and the normal direction nd of the light entrance-side surface 65b of the body portion 65 (the main cross-section of the light control sheet). Each unit optical element 77 has a one-side surface 77b1 lying on one side in the first direction, and the other-side surface 77b2 lying on the other side in the first direction. Each unit optical element 77 may have a triangular shape whose one side lies on the light entrance-side surface 65b of the body portion 65, or a triangular shape whose one side lies on the light entrance-side surface 65b of the body portion 65 and whose top apex, lying below the body portion 65, of the triangular shape is chamfered.

The unit optical elements 77 exert a deflection function by allowing light to pass through one surface of each element and causing the light inside the element to totally reflect at the other surface. As shown in FIG. 11, the first light component from the first light source 24a enters a unit optical element 77 through the one-side surface 77b1, and totally reflects at the other-side surface 77b2. On the other hand, the second light component from the second light source 24b enters a unit optical element 77 through the other-side surface 77b2, and totally reflects at the one-side surface 77b1. Therefore, as shown in FIG. 11, the light axis (direction in which the highest luminosity is exhibited) LD1 of the first light component in a unit optical element 77 can be adjusted by the inclination angle of the other-side surface 77b2, while the light axis (direction in which the highest luminosity is exhibited) LD2 of the second light component in a unit optical element 77 can be adjusted by the inclination angle of the one-side surface 77b1.

In the light control sheet 60 shown in FIG. 11, the inclination angles of the one-side surfaces 77b1 are not the same among the unit optical elements 77 and similarly, the inclination angles of the other-side surfaces 77b2 are not the same among the unit optical elements 77. On the other hand, as described above, the first light component, exiting the light exit surface 31 of the light guide plate 30, has such a strong directionality that it exits in the same direction at varying exit positions along the first direction and similarly, the second light component, exiting the light exit surface 31 of the light guide plate 30, has such a strong directionality that it exits in the same direction at varying exit positions along the first direction. Accordingly, the peak angle that gives the maximum luminance in the angular distribution of luminance, attributable to the first light component, on the light emitting surface 21 varies at varying positions along the first direction and similarly, the peak angle that gives the maximum luminance in the angular distribution of luminance, attributable to the second light component, on the light emitting surface 21 varies at varying positions along the first direction.

When the angular distribution of luminance in a plane parallel to both the front direction and the first direction is measured at a center position in the first direction on the light exit surface 31 of the light guide plate 30 under the following definition: the front direction is 0°; an angle between the front direction and a direction inclined from the front direction toward one side in the first direction is a negative angle; and an angle between the front direction and a direction inclined from the front direction toward the other side in the first direction is a positive angle, the peak angle that gives the maximum luminance in the angular distribution of luminance, attributable to the first light component emitted by the first light source 24a, on the light exit surface 31 of the light guide plate 30 is preferably not less than 65° and not more than 80°. Similarly, when the angular distribution of luminance in a plane parallel to both the front direction and the first direction is measured at a center position in the first direction on the light exit surface 31 of the light guide plate 30 under the following definition: the front direction is 0°; an angle between the front direction and a direction inclined from the front direction toward one side in the first direction is negative; and an angle between the front direction and a direction inclined from the front direction toward the other side in the first direction is positive, the peak angle that gives the maximum luminance in the angular distribution of luminance, attributable to the second light component emitted by the second light source 25a, on the light exit surface 31 of the light guide plate 30 is preferably not less than −80° and not more than −65°. When the peak angles that give the maximum luminance are set within the above ranges, the exiting direction in which the first light component exits the light exit surface 31 of the light guide plate 30 has a strong directionality despite the exit position along the first direction, and similarly the exiting direction in which the second light component exits the light exit surface 31 of the light guide plate 30 has a strong directionality despite the exit position along the second direction. Such a light guide plate 30, when used in combination with the below-described light control sheet 60 of FIG. 11, can stably satisfy the above-described formulae (6) and (7).

In the illustrated example, the other-side surface 77b2 of any one unit optical element 77 is inclined from the front direction at the same inclination angle as the other-side surface 77b2 of another unit optical element 77 lying on the other side of the one unit optical element 77 in the first direction, or is inclined from the front direction more than the other-side surface 77b2 of another unit optical element 77 lying on the other side of the one unit optical element 77 in the first direction. That is to say, as shown in FIG. 11 and the below-described FIG. 15, the inclination angle θbx of the other-side surface 77b2 of a unit optical element 77x with respect to the front direction nd is not less than the inclination angle θby of the other-side surface 77b2 of another unit optical element 77y, lying on the other side of the unit optical element 77x in the first direction, with respect to the front direction nd. In other words, the other-side surface 77b2 of any one unit optical element 77 is not steeper than the other-side surface 77b2 of another unit optical element 77 lying on the other side of the one unit optical element 77 in the first direction. The above-described formula (6) can be satisfied by such a geometric feature. The other-side surface 77b2 of a unit optical element 77 thus gradually tilts downward (tilts on the light entrance-side surface 65b) as the position of the unit optical element 77 changes from the other side to the one side along the first direction. Accordingly, the peak angle in the angular distribution of luminance, attributable to the first light component, gradually decreases as the luminance measurement position changes from the one side to the other side along the first direction.

Similarly, in the illustrated example, the one-side surface 77b1 of any one unit optical element 77 is inclined from the front direction at the same inclination angle as the one-side surface 77b1 of another unit optical element 77 lying on the one side of the one unit optical element 77 in the first direction, or is inclined from the front direction more than the one-side surface 77b1 of another unit optical element 77 lying on the one side of the one unit optical element 77 in the first direction. That is to say, as shown in FIG. 11 and the below-described FIG. 15, the inclination angle θay of the one-side surface 77b1 of a unit optical element 77y with respect to the front direction nd is not less than the inclination angle θax of the one-side surface 77b1 of another unit optical element 77x, lying on the one side of the unit optical element 77y in the first direction, with respect to the front direction nd. In other words, the one-side surface 77b1 of any one unit optical element 77 is not steeper than the one-side surface 77b1 of another unit optical element 77 lying on the one side of the one unit optical element 77 in the first direction. The above-described formula (7) can be satisfied by such a geometric feature. The one-side surface 77b1 of a unit optical element 77 thus gradually tilts downward (tilts on the light entrance-side surface 65b) as the position of the unit optical element 77 changes from the one side to the other side along the first direction. Accordingly, the peak angle in the angular distribution of luminance, attributable to the second light component, gradually decreases as the luminance measurement position changes from the one side to the other side along the first direction.

When the formula (1) is satisfied together with the formulae (6) and (7), not only the above-described advantageous effects can be achieved, but also the half-value angle can be made significantly small in the angular distributions of luminance measured at varying positions on the light emitting surface 21 along the first direction. Thus, when the observation angle range tends to be somewhat narrow because of the large size of the display surface 11 of the display device 10, the advantageous effects due to the formula (1) can be achieved while effectively utilizing light from the light sources 24a, 24b by effectively preventing image light from exiting in directions which cannot be within the observation angle range. When the angular distribution of luminance attributable to the first light component and the angular distribution of luminance attributable to the second light component have similar peak angles at varying positions along the first direction as shown in FIGS. 12 through 14, light visible to a viewer, e.g. light which forms an image viewable to a viewer on the display surface 11, always contains both the first light component and the second light component at least in a certain amount of minor component. This can effectively prevent problems such as color breakup, and can thereby enhance color reproducibility.

In the variation shown in FIGS. 11 through 14, when the angular distribution of luminance in a plane parallel to both the front direction and the first direction is measured at the center position Pc on the light emitting surface 21 under the following definitions: the front direction is 0°, an angle between the front direction and a direction inclined from the front direction toward the one side in the first direction is a negative angle, and an angle between the front direction and a direction inclined from the front direction toward the other side in the first direction is a positive angle, the peak angle $\theta c1$ that gives the maximum luminance in the angular distribution of luminance, attributable to the first light component emitted by the first light source 24a, is preferably not less than $-5°$ and not more than 5° in order to make the half-value angle in the angular distribution of luminance fall within a sufficient range. Similarly, when the angular distribution of luminance in a plane parallel to both the front direction and the first direction is measured at the center position Pc on the light emitting surface 21 under the following definitions: the front direction is 0°, an angle between the front direction and a direction inclined from the front direction toward the one side in the first direction is a negative angle, and an angle between the front direction and a direction inclined from the front direction toward the other side in the first direction is a positive angle, the peak angle $\theta c2$ that gives the maximum luminance in the angular distribution of luminance, attributable to the second light component emitted by the second light source 24b, is preferably not less than $-5°$ and not more than 5°.

In the above-described embodiment, the side surfaces of the light guide plate 30 which oppose each other in the first direction function as the first light entrance surface 33 and the second light entrance surface 34, and the first light source 24a and the second light source 24b are provided beside the first light entrance surface 33 and the second light entrance surface 34, respectively. However, one of the first light source 24a and the second light source 24b may be omitted. In the example shown in FIG. 15, one of the side surfaces of the light guide plate 30 which oppose each other in the first direction serves as a light entrance surface 33, and the second light source 24b is not provided. On the other hand, the same light control sheet 60 as that of FIG. 11 is provided in the example shown in FIG. 15. Accordingly, the above-described formulae (1) and (6) can be satisfied. The distribution of the amount of the first light component along the first direction can be equalized to some extent by the construction of the light guide plate 30.

Figure 15:
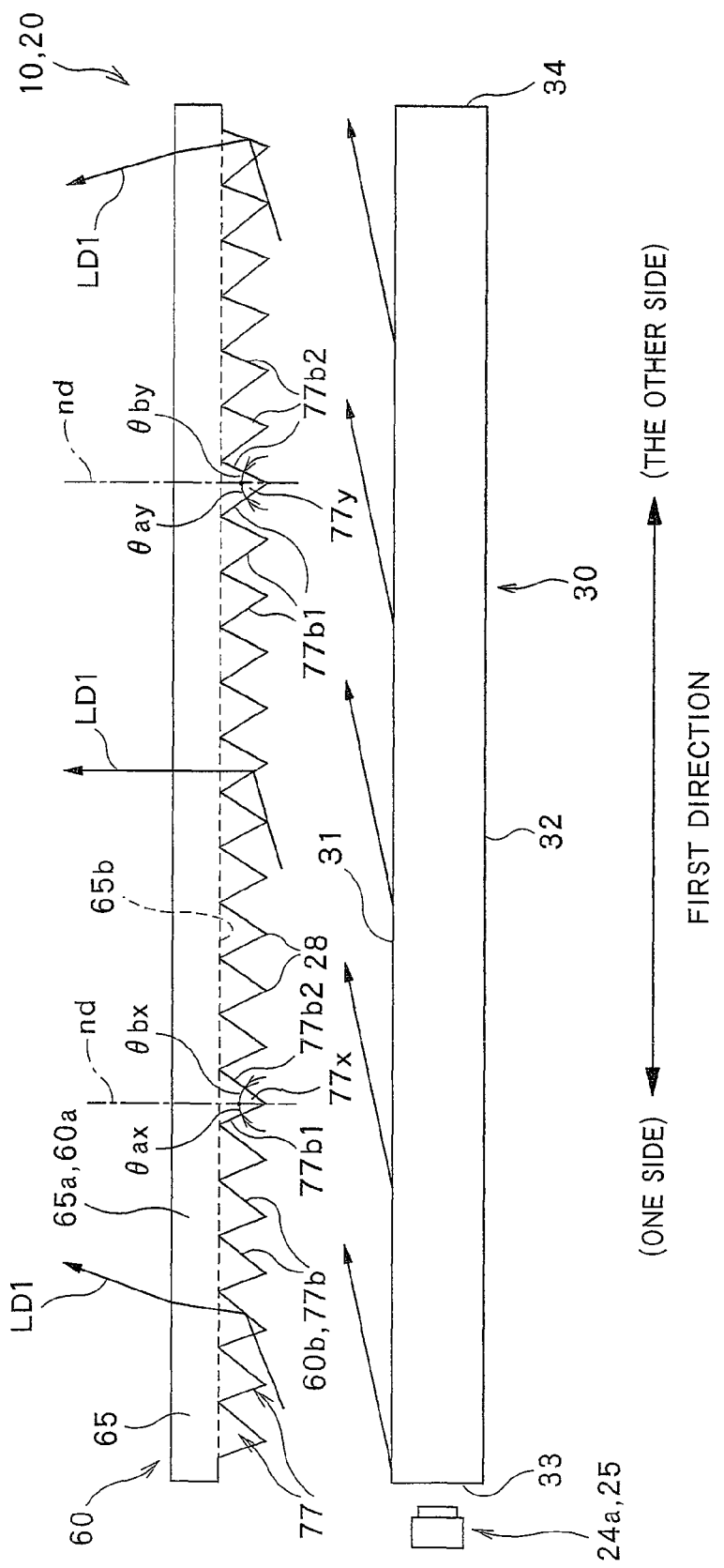
FIG. 15 is a diagram illustrating yet another variation of the surface light source device in the same cross-section as FIG. 2.

In the examples shown in FIGS. 11 and 15, the dimensions, etc. of the light control sheet may be the same as those of the variation shown in FIGS. 9 and 10. Also in the variations shown in FIGS. 11 and 15, the same advantageous effects as in the above-described embodiment can be achieved by setting the luminance characteristics on the light exit surface in the same manner. Thus, it is preferred that in a plane parallel to both the front direction and the first direction, the peak angle $\theta a$ that gives the maximum luminance in the angular distribution of luminance at the first end position Pe1 on the light emitting surface 21 and the peak angle $\theta b$ that gives the maximum luminance in the angular distribution of luminance at the second end position Pe2 on the light emitting surface 21 satisfy the above-described formulae (2) and (3), respectively. Further, it is preferred that the above-described formulae (4) and (5) be satisfied.

It is possible to attach the light diffusing sheet 80 to the light exit-side surface of the light control sheet 60 shown in FIGS. 9, 10, 11 and 15. It is also possible to impart a light diffusing function to the light exit surface 60a or the body portion 65 of the light control sheet 60 shown in FIGS. 9, 10, 11 and 15. A light diffusing function can be imparted to the light control sheet 60 e.g. by roughening the light exit surface 60a or by dispersing a diffusing component in the body portion 65. The light diffusing sheet 80 may be omitted when a light diffusing function is imparted to the light control sheet 60. When a reflection-type polarization separation film (e.g. DBEF manufactured by 3M Company, USA) is incorporated into the surface light source device 20 as described later, the polarization separation film may be attached to the light exit surface 60a of the light control sheet 60 shown in FIGS. 9, 10, 11 and 15.

Though in the light control sheet 60 shown in FIGS. 9, 10, 11 and 15, the unit optical elements 77 each have a triangular cross-sectional shape or a generally-triangular cross-sectional shape having a chamfered top apex, the present invention is not limited to such unit optical elements. For example, the one-side surface 77b1 and the other-side surface 77b2 of each unit optical element 77 may have a bulging or curved contour. The same effects as those of the light control sheet 60 of FIGS. 9, 10, 11 and 15 can be expected if such one-side surfaces 77b1 and such other-side surfaces 77b2 are inclined with respect to the front direction in the same manner as described above.

When the light control sheet 60 shown in FIGS. 9, 10, 11 and 15 is disposed on the outermost light exit side of the surface light source device 20, the light control sheet 60 may be integrated with the display panel 15 e.g. by attaching the light control sheet 60 to the display panel 15 (through adhesion). In this case, a part or the whole of that surface of the light control sheet 60 which is attached to the display panel 15 constitutes the light emitting surface 21 of the surface light source device 20.

The construction of the light guide plate 30 has been described by way of example only and it should be appreciated that modifications may be made thereto. For example, the unit prisms 50 of the light guide plate 30 may each have a polygonal cross-sectional shape other than a triangle, or a cross-sectional shape corresponding to part of an ellipse.

In the above-described embodiment the diffusing component 45 is dispersed in the base portion 40 of the light guide plate 30 so that light that has entered the light guide plate 30 can exit it. However, the present invention is not limited thereto. For example, instead of or in addition to the use of the diffusing component 45, it is possible to configure the back surface 32 of the light guide plate 30 as an inclined surface.

In the above-described embodiment the light sources 24a, 24b are comprised of the plurality of point-like light emitters (LEDs) 25 arranged along the longitudinal direction (second direction) of the light entrance surfaces 33, 34 of the light guide plate 30. However, various other types of light emitters usable in an edge-light type surface light source device, for example, cold-cathode fluorescent lamps extending parallel to the longitudinal direction of the light entrance surfaces 33, 34 of the light guide plate 30, may be used for the light sources 24a, 24b.

The constructions of the surface light source device 20 and the display device 10 have been described by way of example only and it should be appreciated that modifications may be made thereto. For example, the light diffusing sheet 80 having the function of diffusing transmitted light may be omitted. It is possible to additionally provide a reflection-type polarization separation film or the like having a polarization separation function that allows transmission of only a particular polarization component while reflecting the other polarization component(s).

The above-described modifications, of course, may also be made in an appropriate combination to the above-described embodiments.

What is claimed is:

1. A surface light source device having a light emitting surface, comprising:
a light guide plate having a light exit surface and a pair of side surfaces which oppose to each other in a first direction, at least one of the pair of side surfaces serving as a light entrance surface,
wherein an angular distribution of luminance of the light emitting surface in a plane parallel to both a front direction and the first direction satisfies the following relationship:

$$\theta b < \theta c < \theta a$$

where:
$\theta a$ is a peak angle having a maximum luminance in the angular distribution of luminance of the light emitting surface at a first end position on one side of the light emitting surface in the first direction;
$\theta b$ is a peak angle having a maximum luminance in the angular distribution of luminance of the light emitting surface at a second end position on the other side of the light emitting surface in the first direction;
$\theta c$ is a peak angle having a maximum luminance in the angular distribution of luminance of the light emitting surface at a center position of the light emitting surface in the first direction;
where the front direction is defined as 0°, an angle between the front direction and a direction inclined from the front direction toward one side in the first direction is defined as negative value, and an angle between the front direction and a direction inclined from the front direction toward the other side in the first direction is defined as a positive value.

2. The surface light source device according to claim 1, further comprising: a first light source disposed so as to face a first light entrance surface, lying on the one side in the first direction, of the light guide plate; and a second light source disposed so as to face a second light entrance surface, lying on the other side in the first direction, of the light guide plate,
wherein a peak angle $\theta c1$ having the maximum luminance in the angular distribution of luminance of the light emitting surface in a plane parallel to both the front direction and the first direction at the center position has a positive value, which is attributable to a first light component emitted by the first light source,
when the front direction is defined as 0°, an angle inclined from the front direction toward one side of the light emitting surface in the first direction is defined as a negative value, and an angle inclined from the front direction toward the other side of the light emitting surface in the first direction is defined as a positive value.

3. The surface light source device according to claim 2, wherein the peak angle $\theta c1$ is not less than 5° and not more than 15°.

4. The surface light source device according to claim 2, wherein when the angular distribution of luminance in a plane parallel to both the front direction and the first direction is measured at the center position on the light emitting surface under the following definition: the front direction is 0°; an angle between the front direction and a direction inclined from the front direction toward one side in the first direction is a negative value; and an angle between the front direction and a direction inclined from the front direction toward the other side in the first direction is a positive value, a peak angle $\theta c2$ that gives the maximum luminance in the angular distribution of luminance, attributable to a second light component emitted by the second light source, takes a negative value.

5. The surface light source device according to claim 4, wherein the peak angle $\theta c2$ is not less than −15° and not more than −5°.

6. The surface light source device according to claim 2, further comprising a light control sheet disposed on a light exit side of the light guide plate,
wherein the light control sheet has a sheet-like body portion, and a plurality of unit optical elements arranged on a light exit-side surface of the body portion along the first direction and each extending in a direction intersecting the first direction; the ratio of a height Hb of each unit optical element to a width Wb of the unit optical element (Hb/Wb) in a cross-section parallel to both a normal direction of the body portion and an arrangement direction of the unit optical elements is not less than 0.55 and not more than 0.85; and
wherein when the angular distribution of luminance in a plane parallel to both the front direction and the first direction is measured at a center position in the first direction on the light exit surface of the light guide plate under the following definition: the front direction is 0°; an angle between the front direction and a direction inclined from the front direction toward one side in the first direction is a negative value; and an angle between the front direction and a direction inclined from the front direction toward the other side in the first direction is a positive negative, a peak angle that gives the maximum luminance in the angular distribution of luminance, attributable to the first light component emitted by the first light source, on the light exit surface of the light guide plate is not less than 65° and not more than 75°, and a peak angle that gives the maximum luminance in the angular distribution of luminance, attributable to the second light component emitted by the second light source, on the light exit surface of the light guide plate is not less than −75° and not more than −65°.

7. The surface light source device according to claim 2, further comprising a light control sheet disposed on a light exit side of the light guide plate,
wherein the light control sheet has a sheet-like body portion, and a plurality of unit optical elements arranged on a light entrance-side surface of the body portion along the first direction and each extending in a direction intersecting the first direction; the ratio of a height Hc of each unit optical element to a width Wc of the unit optical element (Hc/Wc) in a cross-section parallel to both a normal direction of the body portion and an arrangement direction of the unit optical elements is not less than 0.55 and not more than 0.72; and wherein when the angular distribution of luminance in a plane parallel to both the front direction and the first direction is measured at a center position in the first direction on the light exit surface of the light guide plate under the following definition: the front direction is 0°; an angle between the front direction and a direction inclined from the front direction toward one side in the first direction is a negative value; and an angle between the front direction and a direction inclined from the front direction toward the other side in the first direction is a positive value, a peak angle that gives the maximum luminance in the angular distribution of luminance, attributable to the first light component emitted by the first light source, on the light exit surface of the light guide plate is not less than 65° and not more than 80°, and a peak angle that gives the maximum luminance in the angular distribution of luminance, attributable to the second light component emitted by the second light source, on the light exit surface of the light guide plate is not less than −80° and not more than −65°.

8. The surface light source device according to claim 1, further comprising a first light source disposed so as to face the side surface, lying on the one side in the first direction, of the light guide plate, wherein when the angular distribution of luminance, attributable to a first light component emitted by the first light source, in a plane parallel to both the front direction and the first direction is measured on the light emitting surface at varying positions along the first direction under the following definition: the front direction is 0°; an angle between the front direction and a direction inclined from the front direction toward one side in the first direction is a negative value; and an angle between the front direction and a direction inclined from the front direction toward the other side in the first direction is a positive value, a peak angle $\theta a1$ that gives the maximum luminance in the angular distribution of luminance, attributable to the first light component, at the first end position on the light emitting surface, a peak angle $\theta b1$ that gives the maximum luminance in the angular distribution of luminance, attributable to the first light component, at the second end position on the light emitting surface, and a peak angle $\theta c1$ that gives the maximum luminance in the angular distribution of luminance, attributable to the first light component, at the center position on the light emitting surface, satisfy the following relation:

$\theta b1 < \theta c1 < \theta a1.$

9. The surface light source device according to claim 8, further comprising a light control sheet disposed on a light exit side of the light guide plate, wherein the light control sheet has a sheet-like body portion, and a plurality of unit optical elements arranged on a light entrance-side surface of the body portion along the first direction and each extending in a direction intersecting the first direction; each unit optical element has a one-side surface lying on one side in the first direction, and a other-side surface lying on the other side in the first direction;

wherein the inclination angles of the other-side surfaces are not the same among the unit optical elements; and wherein the other-side surface of any one unit optical element is inclined from the front direction at the same inclination angle as the other-side surface of another unit optical element lying on the other side of the one unit optical element in the first direction, or is inclined from the front direction more than the other-side surface of another unit optical element lying on the other side of the one unit optical element in the first direction.

10. The surface light source device according to claim 8, further comprising a second light source disposed so as to face the side surface, lying on the other side in the first direction, of the light guide plate, wherein when the angular distribution of luminance, attributable to a second light component emitted by the second light source, in a plane parallel to both the front direction and the first direction is measured on the light emitting surface at varying positions along the first direction under the following definition: the front direction is 0°; an angle between the front direction and a direction inclined from the front direction toward one side in the first direction is a negative value; and an angle between the front direction and a direction inclined from the front direction toward the other side in the first direction is a positive value, a peak angle $\theta a2$ that gives the maximum luminance in the angular distribution of luminance, attributable to the second light component, at the first end position on the light emitting surface, a peak angle $\theta b2$ that gives the maximum luminance in the angular distribution of luminance, attributable to the second light component, at the second end position on the light emitting surface, and a peak angle $\theta c2$ that gives the maximum luminance in the angular distribution of luminance, attributable to the second light component, at the center position on the light emitting surface, satisfy the following relation:

$\theta b2 < \theta c2 < \theta a2.$

11. The surface light source device according to claim 10, further comprising a light control sheet disposed on a light exit side of the light guide plate, wherein the light control sheet has a sheet-like body portion, and a plurality of unit optical elements arranged on a light entrance-side surface of the body portion along the first direction and each extending in a direction intersecting the first direction; each unit optical element has a one-side surface lying on one side in the first direction, and a other-side surface lying on the other side in the first direction;

wherein the inclination angles of the one-side surfaces are not the same among the unit optical elements;

wherein the inclination angles of the other-side surfaces are not the same among the unit optical elements;

wherein the one-side surface of any one unit optical element is inclined from the front direction at the same inclination angle as the one-side surface of another unit optical element lying on the one side of the one unit optical element in the first direction, or is inclined from the front direction more than the one-side surface of another unit optical element lying on the one side of the one unit optical element in the first direction; and wherein the other-side surface of any one unit optical element is inclined from the front direction at the same inclination angle as the other-side surface of another unit optical element lying on the other side of the one unit optical element in the first direction, or is inclined from the front direction more than the other-side surface of another unit optical element lying on the other side of the one unit optical element in the first direction.

12. The surface light source device according to claim 1, wherein the peak angle θa and the peak angle θb satisfy the following relations:

$$1/3 \leq \operatorname{Arctan}(|\theta a|) \leq 1/12$$

$$1/3 \leq \operatorname{Arctan}(|\theta b|) \leq 1/12.$$

13. The surface light source device according to claim 1, wherein a maximum luminance PLVa in the angular distribution of luminance at the first end position on the light emitting surface and a luminance FLVa in the front direction in the angular distribution of luminance at the first end position on the light emitting surface, and a maximum luminance PLVb in the angular distribution of luminance at the second end position on the light emitting surface and a luminance FLVb in the front direction in the angular distribution of luminance at the second end position on the light emitting surface, satisfy the following relations:

$$0.6 < (FLVa/PLVa) < 1$$

$$0.6 \leq (FLVb/PLVb) < 1.$$

14. The surface light source device according to claim 1, wherein the light guide plate has a sheet-like base portion including a resin matrix and a diffusing component dispersed in the matrix.

15. The surface light source device according to claim 1, wherein the light guide plate has a sheet-like body portion and a plurality of unit prisms arranged on a light emitting surface-side surface of the body portion along an arrangement direction intersecting the first direction and each extending linearly in a direction intersecting the arrangement direction.

16. A liquid crystal display device comprising:
the surface light source device according to claim 1; and
a liquid crystal display panel disposed on the light exit side of the surface light source device.

17. The liquid crystal display device according to claim 16, wherein the surface light source device includes a light source having a plurality of point-like light emitters arranged along the light entrance surface of the light guide plate; and
wherein the liquid crystal display device further comprises a controller for controlling the output of the point-like light emitters of the light source, the controller being configured to adjust the output of each point-like light emitter according to an image to be displayed.

* * * * *